Figure 1:
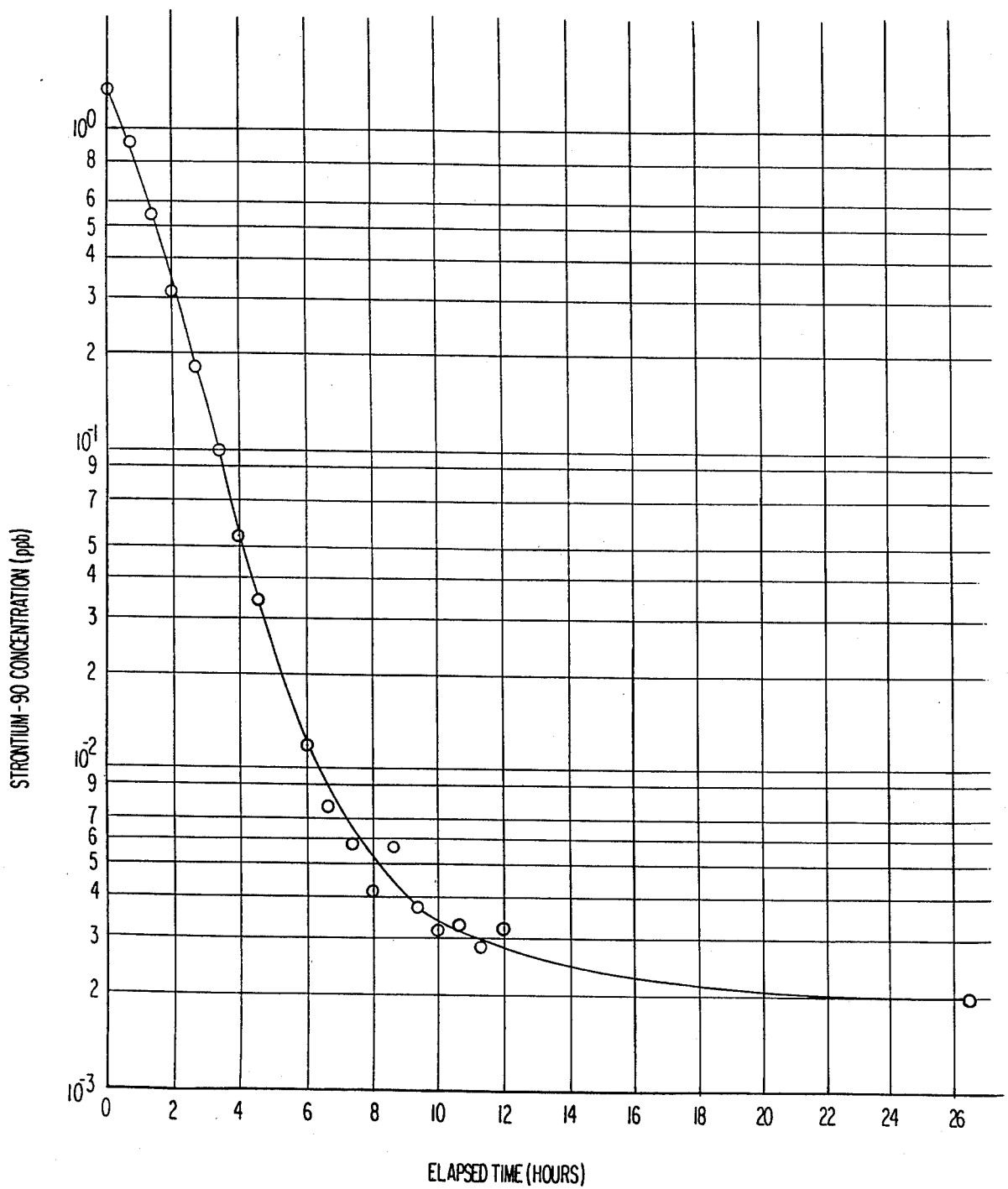

United States Patent [19]

Simmons et al.

[11] Patent Number: 4,469,628

[45] Date of Patent: Sep. 4, 1984

[54] FIXATION BY ION EXCHANGE OF TOXIC MATERIALS IN A GLASS MATRIX

[76] Inventors: Catherine J. Simmons; Joseph H. Simmons, both of 6 Park Overlook Ct.; Pedro B. Macedo, 6100 Highboro Dr., all of Bethesda, Md. 20817; Theodore A. Litovitz, 3022 Friends Rd., Annapolis, Md. 21401

[21] Appl. No.: 370,437

[22] Filed: Apr. 21, 1982

Related U.S. Application Data

[63] Continuation of Ser. No. 039,595, May 16, 1979, abandoned, which is a continuation-in-part of Ser. No. 959,222, Nov. 9, 1978, abandoned.

[51] Int. Cl.³ .......................... C09K 3/00; C09K 11/04
[52] U.S. Cl. ...................................... 252/629; 65/30.1; 210/682; 210/688; 501/5 B; 252/179
[58] Field of Search .................. 65/302, 30.1; 106/52; 210/38 B, 38 C, 682, 688; 252/179, 449, 454, 457, 629; 501/53

[56] References Cited

U.S. PATENT DOCUMENTS

| | | | |
|---|---|---|---|
| 2,616,847 | 11/1952 | Ginell | 252/626 |
| 3,364,148 | 1/1968 | Kivel | 252/644 |
| 3,936,388 | 2/1976 | Unger et al. | 252/182 |
| 4,178,270 | 12/1979 | Fujita et al. | 252/447 |

OTHER PUBLICATIONS

Mizutani et al., J. Non-Crystalline Solids, vol. 30(1), 1978, pp. 23 to 27, abstracted in Chem. Abs., vol. 90, 1979, p. 431, 61739c.

Doremus, R. H., *Glass Science*, John Wiley & Sons, NY, 1973, p. 102.

Wolf et al., "The Preferred Separation", *Chem. Abstracts*, vol. 88, (1978), No. 130448e.

Unger et al., "Pressure-Stable Ion-Exchangers", *Chem. Abstracts*, vol. 80, 1974, No. 115789h.

Patrick et al., "Behavior of Silica Gel Towards Certain Alkalies", J. Phys. Chem., vol. 29, (1925), pp. 1400 to 1405.

Pierce Handbook and General Catalog, 1979–80, Pierce Chemical Co., 1978, pp. 356 to 379.

*Primary Examiner*—Leland A. Sebastian

[57] ABSTRACT

This invention relates to the immobilization of toxic, e.g., radioactive, materials in a silicate glass or silica gel matrix for extremely long periods of time. Toxic materials, such as radioactive wastes containing radioactive cations, which may be in the form of liquids, or solids dissolved or dispersed in liquids or gases, are incorporated into a glass or silica gel matrix, having alkali metal, Group Ib metal and/or ammonium cations bonded to silicon atoms of said glass or silica gel through divalent oxygen linkages, by a process which involves the ion exchange of said toxic or radioactive cations with said alkali metal, Group Ib metal and/or ammonium cations to bind said toxic or radioactive cations to silicon atoms of said glass or silica gel through said silicon-bonded divalent oxygen linkages. Thereafter, the resulting glass or silica gel now characterized by toxic or radioactive cations bonded to silicon atoms through divalent oxygen linkages can be stored, or packaged in suitable containers, or disposed of as by burial, and/or sintered to collapse the pores thereof.

30 Claims, 2 Drawing Figures

FIXATION BY ION EXCHANGE OF TOXIC MATERIALS IN A GLASS MATRIX

RELATED APPLICATIONS

This application is a continuation of our co-pending application U.S. Ser. No. 039,595, filed May 16, 1979, now abandoned, entitled FIXATION BY ION EXCHANGE OF TOXIC MATERIALS IN A GLASS MATRIX, which in turn is a continuation-in-part of our application U.S. Ser. No. 959,222, filed Nov. 9, 1978, now abandoned, entitled: FIXATION BY ION EXCHANGE OF TOXIC MATERIALS IN A GLASS MATRIX, now abandoned.

BACKGROUND OF THE INVENTION

The disposal of large quantities of toxic materials such as high level radioactive wastes stored in spent reactor storage pools, or generated in the reprocessing of spent nuclear power reactor fuel, or generated in the operation and maintenance of nuclear power plants, is a problem of considerable importance to the utilization of nuclear power. It is generally accepted that the most promising approach is to convert these radioactive wastes to a dry solid form which would render such wastes chemically, thermally and radiolytically stable.

The problem of dry solid stability of radioactive wastes is closely related to the safety of human life on earth for a period of more than 20,000 years. For example, radioactive wastes usually contain the isotopes $Sr^{90}$, $Pu^{239}$, and $Cs^{137}$ whose half lives are 28 years, 24,000 years, and 30 years, respectively. These isotopes alone pose a significant threat to life and must be put into a dry, solid form which is stable for thousands of years. The solid radioactive waste form must be able to keep the radioactive isotopes immobilized for this length of time, preferably even in the presence of an aqueous environment. The radioactive wastes are produced in high volumes and contain long-lived, intermediate-lived, and short-lived radioactive ions and some non-radioactive ions. These solutions can be highly corrosive and it is difficult, if not impractical, to reduce them to concentrated forms for further processing or storage.

The two most popular types of commercial reactors both of which produce low level wastes are the Boiling Water Reactor (B.W.R.) and the Pressurized Water Reactor (P.W.R.). In a typical Pressurized Water Reactor (P.W.R.), pressurized light water circulates through the reactor core (heat source) to an external heat sink (steam generator). In the steam generator, where primary and secondary fluids are separated by impervious surfaces to prevent contamination, heat is transferred from the pressurized primary coolant to secondary coolant water to form steam for driving turbines to generate electricity. In a typical Boiling Water Reactor (B.W.R.), light water circulates through the reactor core (heat source) where it boils to form steam that passes to an external heat sink (turbine and condenser). In both reactor types, the primary coolant from the heat sink is purified and recycled to the heat source.

The primary coolant and dissolved impurities are activated by neutron interactions. Materials enter the primary coolant through corrosion of the fuel elements, reactor vessel, piping, and equipment. Activation of these corrosion products adds radioactive nuclides to the primary coolant. Corrosion inhibitors, such as lithium, are added to the reactor water. A chemical shim, boron, is added to the primary coolant of most P.W.R.'s for reactivity control. These chemicals are activated and add radionuclides to the primary coolant. Fission products diffuse or leak from fuel elements and add nuclides to the primary coolant. Radioactive materials from all these sources are transported around the system and appear in other parts of the plant through leaks and vents as well as in the effluent streams from processes used to treat the primary coolant. Gaseous and liquid radioactive wastes (radwaste) are processed within the plant to reduce the radioactive nuclides that will be released to the atmosphere and to bodies of water under controlled and monitored conditions in accordance with federal regulations.

The principal methods or unit operations used in the treatment of liquid radwaste at nuclear power plants are filtration, ion exchange, and evaporation.

Liquid radwastes in a P.W.R. are generally segregated into five categories according to their physical and chemical properties as follows:

a. Clean Waste includes liquids which are primarily controlled releases and leaks from the primary coolant loop and associated equipment. These are liquids of low solids content which are treated in the reactor coolant treatment system.

b. Dirty or Miscellaneous Waste includes liquids which are collected from the containment building, auxiliary building, and chemical laboratory; regeneration solutions from ion-exchange beds; and solutions of high electrical conductivity and high solids content from miscellaneous sources.

c. Steam Generator Blowdown Waste is condensate from the steam that is removed (blowdown) periodically to prevent excessive solids buildup.

d. Turbine Building Drain Waste is leakage from the secondary system that is collected in the turbine building floor sump.

e. Detergent Waste includes liquids from the laundry, personnel decontamination showers, and equipment decontamination.

Liquid radwastes in a B.W.R. are generally segregated into four categories according to their physical and chemical properties as follows:

a. High-Purity Waste includes liquids of low electrical conductivity ($<50$ $\mu$mho/cm) and low solids content, i.e., reactor coolant water that has leaked from the primary reactor system equipment, the drywell floor drain, condensate demineralizer backwash, and other sources of high-quality water.

b. Low-Purity Waste includes liquids of electrical conductivity in excess of 50 $\mu$mho/cm and generally less than 100 $\mu$mho/cm; i.e., primarily water from floor drains.

c. Chemical Waste includes solutions of caustic and sulfuric acid which are used to regenerate ion exchange resins as well as solutions from laboratory drains and equipment decontamination.

d. Detergent Waste includes liquids from the laundry and personnel decontamination showers.

The liquid radwastes from both types of reactors are highly dilute solutions of radioactive cations, and other dissolved radioactive materials as well as undissolved radioactive particles or finely divided solids.

A practical process for disposing of radioactive materials in a dry solids form having high resistance to leaching and other forms of chemical attack would not only be suitable for the disposal of radioactive nuclear wastes, but also for the fabrication of radioactive sources useful in industry, medicine, and in the laboratory.

Heretofore, there did not exist any practical, foolproof means for the safe disposal, storage and immobilization of pernicious radioactive waste material. Present day storage containers do not provide sufficient isolation and immobilization of such radioactive material, sufficient long-term resistance to chemical attack by the surroundings, and sufficient stability at high temperature.

Currently low level radioactive waste, that is radioactive waste generated at reactor sites, is disposed of in the following manner:

(A) The dead ion exchange resin containing radioactive waste is mixed with cement and cast in forty gallon barrels.

(B) The bottoms from evaporators which contain the radioactive contaminated boric acid and the solutions used to regenerate the ion exchange columns are mixed with cement powder and cast in forty gallon barrels.

(C) The filters containing particulate forms of radioactive waste are usually encased in cement in barrels.

These cement barrels are transported to low level radioactive waste sites and buried six feet deep in the ground. At least one of the sites is in the United States Eastern States and exposed to substantial rainfall. In Europe, these barrels are buried at sea. In both cases water will first corrode the metal then the cement and will relatively quickly expose the radioactive ions for leaching into the ground water or sea water. Because the U.S. burials are only a few feet deep, the contaminated water can readily intermix with streams, lakes and rivers, thus, entering the ecosphere. The rationale for this practice is the assumption that upon sufficient dilution the radioactivity becomes harmless.

Some of the most serious nuclear wastes are cesium and strontium which are biologically similar to sodium and calcium. They have thirty year half lives indicating that they should be isolated from the exosphere for at least three hundred years (ten half lives). At Bikini, the experts assumed that dilution had made the island inhabitable after decades in which no atomic explosions were performed, yet when the population was returned to the island its health was deleteriously effected. It has since been realized that plants and animal life biologically reconcentrate these radioactive elements back up to dangerous levels.

Thus, the "safe" concentration of radioactive waste must be much lower than accepted values and a more durable substitute for cement is needed. In one aspect, the present invention presents a safe alternative to the cement-solidification of low level waste.

Another route heretofore suggested is the so-called dry solids approach which involves the fixation of the waste materials in glasses via mixing with glass-forming compositions and melting to form glasses. This approach offers some improvement regarding isolation and decrease in the rate of release of radioactive elements when the outer envelopes or containers are destroyed. Further, such glasses remain relatively more stable at high temperatures than plastic and are generally more chemically durable in saline solutions than are metals. Glasses with high chemical durability and low alkali ion conductivity suitable for this prior art technique are formed at very high temperatures, e.g., 1800° C. and higher. Prior processes utilizing such high melting glass-forming compositions are economically unsound and moreover, cause a dangerous problem due to the risk of volatilization of pernicious radioactive materials. Furthermore, this procedure is restricted to dry solid radioactive wastes and provides no solution to the high volumes of liquid radioactive wastes produced by the operations and maintenance of nuclear reactors, by the current practice of storing spent fuels in pools of water, and by spent reactor fuel recovery systems.

In view of the overall difficulties of handling radioactive material, and especially in view of the danger of volatilization of radioactive material into the atmosphere, attention has been directed to using glass compositions having relatively low melting temperatures, that is to say, using glass compositions with $SiO_2$ contents as low as 27 weight percent. While the problem of volatilization of radioactive materials is reduced, it is not completely controlled. Moreover, the resultant glass composition exhibits greatly reduced chemical durability and increased ion diffusion rates for the radioactive materials present therein. The greater this diffusion rate, the lower is the ability of the glass to keep the radioactive materials immobilized in its matrix. For long-term containment of radioactive waste, demanded under present day standard, these prior glass compositions are inadequate.

U.S. Pat. No. 3,640,888 teaches the production of neutron sources by encapsulating californium-252 in glass using the steps of packing an open-ended vitreous tube a porous powder of quartz having an organic liquid ion exchange material sorbed thereon, passing an aqueous solution containing californium-252 cation through the powdered quartz, drying and heating the powdered quartz and tube in air to oxidize and volatilize the organic liquid ion exchange material resulting in the nonvolatile oxide of californium-252, and then fusing the tip and powder contents to form a vitreous body containing the californium-252 oxide. The patent, however, does not disclose, teach or suggest the use of porous glass containing silicon-bonded cation-oxy groups which are exchangeable by radioactive cations in aqueous solution nor does it disclose or suggest any method or technique for concentrating and safely disposing of radioactive wastes.

U.S. Pat. No. 1,533,794 teaches the packaging of radium emanations in a glass capillary tube followed by sealing the ends of the tube and thus enclose emanations previously introduced into the tube. There is no teaching, however, of any method for concentrating and/or immobilizing radwaste.

U.S. Pat. Nos. 2,336,227; 2,340,013; 2,522,524; 3,364,148 and 4,083,579 relate to the treatment of porous glass with non-radioactive ions (radioactive ions in the case of 3,364,148) followed by heating to close the pores which contain the ions. U.S. Pat. Nos. 3,147,225 discloses refractory particles, which contain no or minor amounts of silica and preferably are crystalline, within which particles a specifically selected radioactive cation is firmly fixed for use in self-luminous markers, liquid level indicators and other applications. There is no disclosure or suggestion in any of these patents, however, of reacting a silicate glass or silica gel having silicon-bonded alkali metal oxy, Group Ib metal cation oxy and/or ammonium cation oxy groups with radioactive wastes which typically are complex mixtures of radioactive and non-radioactive compounds and/or ions nor is there any disclosure of procedures for treating radioactive wastes.

U.S. Pat. No. 3,116,131 discloses the method of binding expanded silica particles with a binder and shaping and curing into a desired form, followed by impregnation with a solid desiccant, e.g., sodium hydroxide, and followed by impregnation with a radioactive gas and steam to absorb the water vapor followed by capillary condensation thereby entraining the radioactive gas in the pores after which the pores are closed by heating. The patent fails to disclose the chemical combination of waste radioactive ions in the pores of a porous glass or silica gel by ion exchange followed by closing the pores to provide the dual security of chemical combination and mechanical entrapment of the radioactive ions in the glass.

U.S. Pat. No. 3,959,172 discloses the method of forming and reacting a mixture of silicate or other source of silicon, a radionuclide waste and a metal cation to produce complex metalosilicate crystals which entrap the radionuclide waste. U.S. Pat. Nos. 3,451,940 and 3,849,330 disclose the utilization of a thermite reaction to form a complex polysilicate product containing the radioactive wastes. None of these patents teach or suggest the use of porous glass or silica gel which is characterized by an interconnecting porous structure of high ion-exchange capability such that upon contact with pernicious liquid radwaste the radioactive species (cations, for the most part) thereof become "ion-exchanged" to the glass or silica gel, and/or followed by treating to collapse the porous structure thereof to immobilize such radioactive species.

U.S. Pat. No. 3,167,504 discloses the purification of radioactive waste liquid by absorption on a synthetic zeolite which is then sealed in a suitable container for burial. There is no disclosure of the porous glass or silica gel discussed previously and/or of heating to collapse the pores of a porous glass or silica gel around radioactive materials.

U.S. Pat. Nos. 3,114,716; 3,262,885; 3,365,578 and 4,020,004 each deal with various techniques involving the preparation of glass-forming mixtures followed by firing to form a glass and none of them disclose the impregnation of a porous glass or silica gel with radioactive wastes whereby the radioactive species thereof become chemically bonded to the porous glass or silica gel followed by heating to collapse the pores.

U.S. Pat. No. 3,093,593 discloses methods for disposing of radioactive wastes by forming a porous ceramic piece from clays and other silicates followed by prefiring such pieces to destroy ion exchange capacity and thereafter impregnating the prefired pieces with radioactive liquid wastes. The pieces saturated with radioactive waste are then heated to vitrify them and render them non-absorptive. This patent teaches away from our invention which relies on ion exchange for strongly binding the radioactive waste in the pores of a glass or silica gel.

U.S. Pat. No. 3,938,974 relates to glass, optical wave guide fibers and their production. Radioactive materials cannot be used in such fibers because they form color centers which absorb light. Not only does this patent fail to disclose the use of radioactive materials, the presence of such materials are inimical to the express objects of the patent.

Two articles, The Behavior of Silica Gel Towards Certain Aklalies and Salts in Aqueous Solution by W. A. Patrick and E. H. Barclay, J. Phys. Chem., Volume 29, page 1400, 1925, and Interaction of Metal Silica Gels With Aqueous Electrolyte Solutions by L. V. Ponomareva, A. P. Dushina and V. B. Aleskovskii, Zhurnal Prikladnoi Khimii, Vol. 48, No. 10, pp. 2150–2155, 1975 relate to the ion exchange of alkali metal cations in a silica gel with heavy metal cations. However, neither of these articles are concerned with methods to remove radioactive species from radioactive waste streams by impregnating porous glass or silica gel with such streams, followed by heating to collapse the pores.

As will be apparent hereinafter from the various aspects of applicant's contributions to the art, there are provided novel methods to obtain novel compositions and articles for the containment of pernicious and dangerous radioactive materials over extraordinarily long periods of time. Unlike melting glass containment procedures, the methods of the invention need not involve any steps which would expose radioactive material to high temperatures, e.g., above about 900° C., thereby eliminating the environmental hazard due to possible volatilization of radioactive material into the atmosphere.

Belgian Pat. No. 839,705, issued July 16, 1976 and German Offenlegungsschrift No. 2,611,495, published July 10, 1976 correspond substantially to U.S. Pat. No. 4,110,096, issued Aug. 29, 1978 to Pedro B. Macedo named as an inventor herein and Theodore A. Litovitz. These patents and Offenlegungsschrift contain essentially the same disclosures but there is no disclosure of porous glass forms having sufficient ion exchange capabilities to bind practical amounts of radioactive cations to the glass to thereby concentrate and contain said radioactive cations in the manner taught herein. Although mention is made of removing silica gel, that may have deposited in the pores of the porous glass during its manufacture, by washing with sodium hydroxide, it has been found that procedures for doing so known in the art fail to produce sufficient amounts of silicon-bonded sodium oxy (ion exchange) groups needed for providing the binding of practical levels of radioactive cations from the radwaste. Furthermore, the presence of silica gel in the pores can be advantageous in this invention as providing more surface area and a higher proportion of silicon-bonded hydroxyl groups and ultimately higher amounts of silicon-bonded metal oxy or ammonium oxy groups for ion exchange with radioactive cations.

SUMMARY OF THE INVENTION

The invention relates to the concentration and immobilization of toxic cations, such as, $Hg^{++}$, $Hg^+$, $Cd^{++}$, $Tl^+$, $Pb^{++}$, radioactive cations, and the like for extremely long periods of time.

In one aspect, the invention contemplates novel sintered silicate glass (preferred) or silica gel compositions or articles having high chemical durability to aqueous corrosion and having sufficiently low radioisotope diffusion coefficient values to provide protection of the environment from the release of radioactive material such as radioactive isotopes, nuclear waste materials, etc., which are chemically bound and encapsulated or entrapped therein. Such glass or silica gel compositions are characterized by at least 75 mol percent of $SiO_2$ and by a radiation activity illustratively above one millicurie, preferably greater than one curie, per cubic centimeter of said compositions. When highly dilute radwastes are treated with the porous silicate glass or silica gel pursuant to this invention for the purpose of concentrating and immobilizing the radwaste for storage, the radiation activity of the porous silicate glass or silica gel may not reach the level of one millicurie per cubic centimeter of the porous silicate glass or silica gel and may remain below 1 microcurie per cc., when it becomes expedient for other reasons to store, or package in suitable containers, or dispose of as by burial, and/or to collapse the pores of the glass or silica gel. In concentrating and immobilizing radioactive cations in dilute radwastes, the porous silicate glass or silica gel can be loaded up to 10 microcuries per cc. or more but usually is loaded up to 1 microcurie per cc. of said porous glass of silica gel. The radioactive material is in the form of radioactive cations that are bonded to silicon by divalent oxy groups. In one aspect, the amount of radioactive material contained in the novel glass compositions is at least 1 ppb (part per billion based on weight), generally in the form of silicon-bonded oxy groups. In the practice of the novel methods whereby liquid radwaste is "decontaminated", a plurality, e.g., at least five and preferably at least ten, of the radioactive species listed hereinafter become bonded to the silicon of the glass through divalent oxy groups. Preferably the novel compositions should contain at least 82 mol percent $SiO_2$, most preferably greater than 89 mol percent $SiO_2$.

From a practical standpoint, the upper limit of radioactive material contained in the silicate glass or silica gel composition will be governed, to a degree, by such factors as: The $SiO_2$ concentration in the composition, by the concentration and type of other ingredients which may be present in the composition such as $B_2O_3$, $Al_2O_3$, $TiO_2$, $P_2O_5$ zirconia, alkali metal oxides and $GeO_2$, by the type of radioactive material, by the volume fraction of the porous structure in the porous glass or silica gel precursor, by the various techniques employed to fix and/or encapsulate the radioactive material in the composition and other factors. A typical range of radioactive cation content is about 1 ppb to about 20,000 ppm, preferably about 10 ppb about 1000 ppm, in the porous glass.

Radioactive materials which can be chemically bound or fixed in the glass or silica gel matrix include radioactive elements (naturally occurring isotopes and man-made isotopes and existing as liquids or solids dissolved or dispersed in liquids or gases), in the form of the cation, such as rubidium, strontium, the lanthanides, e.g., La, Ce, Pr, Nd, Pm, Sm, Eu, Gd, Tb, Dy, Ho, Er, Tm, Yb, Lu, cobalt, cadmium, silver, zirconium, molybdenum, technetium, niobium, ruthenium, rhodium, palladium, tellurium, cesium, barium, francium, yttrium, radium and actinides, e.g., Ac, Th, Pa, u, Np, Pu, Am, Cm, Bk, Cf, Es, cations. Especially suitable in the practice of the invention are radioactive wastes from nuclear reactors, spent resactor fuel reprocessing, spent fuel storage pools or other radioactive waste producing processes.

In one aspect the silicate glass or silica gel, containing the radioactive cations bonded to silicon through oxy groups pursuant to this invention, can be further contained within a collapsed glass article of a variety of shapes or forms, e.g., glass tube, having enhanced containment properties and characterized by an outer clad whose composition is at least about 90 mol percent silica, preferably greater than about 95 mol percent, and whose inner core contains the radioactive materials. The high silica content of the clad imparts to the articles a considerably greater chemical durability and resistance to leaching by ground waters. The inner core has a lower silica concentration of the order of at least about 70 mol percent silica, preferably about 82 mol percent, and most preferably about 89 mol percent.

In one aspect, the broad invention is directed to novel methods which involve ion-exchanging non-radioactive cations (alkali metal, Group Ib, and ammonium cations) bonded to silicon through divalent oxy groups in a porous silicate glass (which is preferred) or silica gel matrix via impregnation techniques which desirably involve impregnation with a liquid and desirably still with an aqueous medium, of pH varying from 2 to 13, suitably from about 4 to 11, preferably from about 6 to about 9.5 for various preferred embodiments. The impregnating medium contains radioactive species including radioactive cations and the cation exchange reaction occurs on the surfaces of said glass or gel, in particular, on the surfaces of the myriad of interconnecting porous structure thereof. Thus, the non-radioactive metal or ammonium cations are displaceable by said radioactive cations thereby resulting in an exchange of the radioactive cations for said non-radioactive cations whereby the radioactive cations are chemically bonded to silicon through the divalent oxygen linkages. Thereafter, the resulting porous silicate glass or silica gel can be stored, or packaged or "containerized" in suitable containers or forms, or disposed of as by underground burial or by burial at sea, and/or the pores thereof can be collapsed by heating thereby fixing and/or mechanical encapsulating the radioactive cations within a resultant chemically inert, non-porous glass product.

When heating to collapse the pores, the impregnated porous glass or silica gel can be dried to remove liquid, such as any solvents and/or volatile materials in the pores and/or it can be washed to remove any solvents or unreacted materials residing within the pores or on the surface of the glass or silica gel followed by drying to remove the washing solvent.

Various aspects of the invention are directed to novel methods for "decontaminating" radioactive waste streams which contain cationic radioactive species therein, especially radioactive streams such as the radioactive primary coolant water of the boiling water reactor system, the radioactive secondary coolant water (which drives the turbine) in the pressurized water reactor system, and generally the liquid radwastes exemplified previously which accumulate during the operation of such systems, by impregnating the porous glass or silica gel discussed herein with such streams thus chemically binding radioactive cationic species through divalent oxy groups to the Si of the glass or gel. The preferred methods contemplated by the practice of the invention utilize the silicate glass discussed herein rather than the silica gel since much lesser amounts of silica are dissolved into the system. This is of especial importance since the (primary and secondary) coolant waters are contained in a closed circulating system and a build up of silica in these coolant waters is not desirable. When liquid radwaste is disposed of as in a river, the silica build up does not appear to be a problem.

Particularly desirable embodiments of the invention are directed to novel methods which utilize porous silicate glass (preferred) characterized by ammonium cations (preferred) bonded through divalent oxy groups to silicon to remove radioactive cationic species and other cationic species from the primary coolant water of a (BWR) boiling water reactor system and/or the secondary coolant water of a (PWR) pressurized water reactor system, the pH being maintained in the range of approximately neutral to low-medium basicity, preferably from about 7 to about 9.5, and preferably still from above about 7 to about 9. Porous silicate glass (preferred) having hydroxyl groups bonded to silicon can be used as the ion-exchanger per se in the aforesaid (BWR) primary coolant water, the pH range thereof then being adjusted by the addition, desirably intermittent addition, of ammonium hydroxide thereof. In this manner the proton (H+) of the hydroxyl group is exchanged with cationic ammonium. Since the ammonium species when subjected to relatively high radiation can convert to acids or acidic species, e.g., nitrates, continuous monitoring and adjustment of the pH range are precautions to follow. In these particular embodiments the porous silicate glass containing bonded cationic ammonium can suitably replace, in total or in part, the so-called conventional and literature described condensate polishers, e.g., deep bed type which generally consists of standard demineralizer vessels filled with a neutral form of mixed-bed ion exchange resins and/or filter/demin type which is essentially a large precoated filter that utilizes a powdered HOH form of ion exchange medium instead of the standard diatomatious earth.

Still further desirable embodiments of the invention are directed to novel methods which utilize porous silicate glass (preferred) characterized by lithium cations (preferred) bonded through divalent oxy groups to silicon to remove radioactive cationic species and other cationic species from the primary coolant water of a (PWR) pressurized water reactor system, the pH range of this system being maintained from approximately 6 to 8, suitably from about 6 to approximately 7. A typical PWR water chemistry includes:

| Boron | up to 4000 ppm* |
|---|---|
| Lithium as $^7$Li, ppm | 0.2 to 6 ppm |
| Total silica as $SiO_2$ | 200 ppb** (max) |
| Chlorides as Cl$^-$ | 0.2 ppm (max) |
| Hydrogen as $H_2$, Std cc/Kg $H_2O$ | 20–40 |
| Total Dissolved Gases, Std cc/Kg $H_2O$ | 100 |
| Total suspended solids | 1 ppm (max) |

*ppm = parts per million
**ppb = parts per billion

In these latter embodiments the lithium bonded ion-exchange glass is multi-functional inasmuch as it can function as a cationic exchanger, as a corrosion inhibitor by "adjusting" the pH (due to the large quantities of the chemical shim, boron, in the PWR coolant) to a weakly acidic pH range, and as a filter medium. As such, well known and described mixed bed ion exchangers and/or filters (as in condensate polishers) of a PWR system can be replaced in part or in toto by the lithium bonded porous silicate glass (preferred).

Advantages to be noted at this time is the fact that conventional organic ion-exchange resins used in PWR and BWR systems to "decontaminate" coolant water and radwaste streams decompose or loses their stability during operation especially when the resin acquires or is exposed to radiation of certain levels of intensity, e.g., $10^8$ rad. Such decomposition or loss of stability is not manifest in the utilization of the cation exchange porous silicate glass or silica gel described herein. Additionally, it has been observed that one unit volume of said glass or gel can "concentrate" the radioactive cationic species contained in upwards of ten unit volumes of BWR coolant and/or PWR coolant and/or liquid radwaste as compared with molecular stuffing techniques wherein maximum concentration is manifest by merely introducing and causing precipitation of cationic species from two or perhaps three unit volumes of simulated coolants of liquid radwaste per unit volume of said glass or gel. Also, the cation exchange porous glass in particulate form, e.g., bead, packing, etc., conveniently containerized, for example, in a column is highly efficient inasmuch as it allows much greater throughputs of PWR coolant, BWR coolant, and/or liquid radwaste contacting greater surface areas of glass than is the case when utilizing comparable dimensioned organic cationic exchange column.

The porous silicate glass or silica gel is made in such manner as to contain non-radioactive cations selected from the group consisting of alkali metal cations, Group Ib metal cations and/or ammonium cations bonded to silicon through divalent oxy linkages —O—. Silicate glass as formed by the phase-separation and acid leaching process contains large amounts of silicon-bonded hydroxyl groups. We have found that the protons of these silicon-bonded hydroxyl groups exchange readily with other cations only under highly alkaline conditions. Because of this, it is difficult or impractical to utilize such glasses to process most types of radioactive wastes especially those of the type that decompose, precipitate or are otherwise adversely affected by alkaline agents.

Furthermore, in most cases, radiactive wastes, such as those resulting from reactor-fuel reprocessing are highly dilute aqueous solutions. The adjustment of such solutions to a high enough pH to provide effective ion exchange with protons of silicon-bonded hydroxyl groups of the glass requires the addition of large amounts of an alkaline substance and, in those cases where the reclaimed water to be recycled back to the reprocessor or the reactor is being treated, the pH needs to be subsequently compensated which requires the addition of large amounts of acidic materials. Thus, ion exchange treatment techniques utilizing porous silicate glass or silica gel containing silicon-bonded hydroxyl groups is at best uneconomical and impractical. In contrast, it has been unexpectedly found that, when the protons of the silicon-bonded hydroxyl groups are replaced with alkali metal cations (preferred) and/or Group Ib cations and/or ammonium cations (preferred) the radioactive cations readily exchange with such monovalent cations at acid, neutral or alkaline pH, thus, making it unnecessary to adjust the pH of the radioactive material being impregnated into the pores of the porous silicate glass or silica gel.

It has also been unexpectedly found that radioactive cations can be substantially completely removed from very dilute solutions or dispersions thereof in water. For example, water containing radioactive cations can be purified down to a few parts per billion of radiactive cations by treatment with porous silicate glass or silica gel having the above-described monovalent cations bonded to silicon through divalent oxygen linkages. It has also been unexpectedly found that the impregnation of the porous silicate glass or silica gel requires a relatively short period of time for effecting reasonably extensive ion exchange.

In the embodiment where an outer clad containing essentially no radioactive material is disposed around a core containing the radioactive material, the porous silicate glass or silica gel can be placed within a non-porous tube of Vycor glass or other appropriate glass and then is impregnated with the radioactive material. Subsequently, during or after heating to collapse the pores of the silicate glass or silica gel the tube is caused to collapse the tube around the silicate glass or silica gel. A vacuum can be created within the tube to facilitate the collapsing of the tube on the silicate glass or silica gel.

The literature adequately describes the preparation of the porous silicate glass compositions. Suitable glass compositions which may be utilized in the novel methods generally contain $SiO_2$ as a major component, have a large surface area and have large amounts of silicon-bonded hydroxyl groups on their surfaces. In the practice of various embodiments of the invention the $SiO_2$ content of the porous glass or silica gel desirably is at least about 75 mol percent $SiO_2$, preferably at least about 82 mol percent $SiO_2$, and most preferably at least about 89 mol percent $SiO_2$. Such glasses are described in the literature, see U.S. Pat. Nos. 2,106,744; 2,215,036; 2,221,709; 2,272,342; 2,326,059; 2,336,227; 2,340,013; 4,110,093 and 4,110,096, for example. The disclosures of the last two mentioned patents are incorporated herein by reference.

The porous silicate glass compositions can also be prepared in the manner described in U.S. Pat. No. 3,147,225 by forming silicate glass frit particles, dropping them through a radiant heating zone wherein they become fluid while free falling and assume a generally spherical shape due to surface tension forces and thereafter cooling them to retain their glassy nature and spherical shape.

In general, the porous silicate glass can be made by melting an alkali-borosilicate glass, phase-separating it into two interconnected glass phases and leaching one of the phases, i.e., the boron oxide and alkali metal oxide phase, to leave behind a porous skeleton comprised mainly of the remaining high silicate glass phase. The principal property of the porous glass is that when formed it contains a large inner surface area covered by silicon-bonded hydroxyl groups. We prefer to use porous glass made by phase-separation and leaching because it can be made with a high surface area per unit volume and has small pore sizes to give a high concentration of silicon-bonded hydroxyl surface groups, and because the process of leaching to form the pores leaves residues of hydrolyzed silica groups in the pores thus increasing the number of silicon-bonded hydroxyl surface groups present. The porous silicate glass may be in the shape of a suitable geometric or non-geometric container such as a cylinder, or it may be in particulate form such as powder, beads, spheroid, etc., desirably contained in a suitable container or conforming to the shape of the container such as a column, nylon bag, cube, plate-like membrane, cylinder, sphere, etc., and thereafter (or prior thereto) ion-exchanged so that the protons of the silicon-bonded hydroxyl groups are replaced with alkali metal cations and/or Group Ib cations and/or ammonium cations.

The literature also adequately describes the preparation of silica gel compositions which can be employed in this invention. These materials are available, for example, as LUDOX silica gel sold by E. I. DuPont de Nemours & Co. which contains 0.08 to 0.6 wt. percent $Na_2O$ as titratable alkali believed to be present as silicon-bonded NaO-groups.

The porous silicate glass or silica gel contains about 0.3 mol percent to about 10 mol percent, preferably about 1 mol percent to about 10 mol percent, most preferably about 3 mol percent to about 5 mol percent, of non-radioactive metal or ammonium cation oxy groups, i.e., alkali metal, Group Ib metal and/or ammonium cation oxy groups. The surface to weight ratios for the porous silicate glass and/or silica gel employed in our invention are at least about 0.1 m²/g to at least several thousand m²/g, e.g., 10,000 m²/g. preferably at least upwards of 100 m²/g. Desirably, the surface to weight ratio of the starting silicate glass or silica gel ranges from about 5 to about 1500 m²/g. In the case of the porous silicate glasses used herein, the protons of the silicon-bonded hydroxyl groups are ion exchanged for the alkali metal, Group Ib metal and/or ammonium cation, e.g., sodium hydroxide, potassium hydroxide, cesium hydroxide, lithium hydroxide, rubidum hydroxide, cupric hydroxide, cuprous hydroxide, ammonium hydroxide and such salts of these metals, that are capable of exchanging the salt cations for the protons of the silicon-bonded hydroxyl groups, such as their nitrates, sulfate, acetates, bromides, phosphates, chlorides and the like of these metals including silver nitrate, gold nitrate, sodium nitrate, cesium nitrate, lithium nitrate, cupric nitrate and the like. As indicated hereinabove, suitable non-radioactive metal cations for exchange with the protons of silicon-bonded hydroxyl groups, i.e., for attachment to silicon through divalent oxygen and subsequent displacement by the radioactive cation, include sodium, potassium, cesium, rubidium, lithium, copper (cupric and/or cuprous), silver, gold and ammonium.

The proportion or concentration of silicon-bonded hydroxyl groups on the porous silicate glass surfaces can be regulated by regulating the surface area of the porous silicate glass during its preparation as is well-known in the art. Generally, the surface area is controlled by the temperature and time at temperature during the phase-separation portion of the preparation of the porous silicate glass. Thus, the longer the time at temperature and/or the higher the temperature used in the phase-separation, the greater the pore diameter and, therefore, the smaller the surface area per gram in the resulting porous silicate glass. Conversely, the surface area, and thus the proportion of surface $\equiv$SiOH groups available for ion exchange with alkali metal, Group Ib metal and/or ammonium cations, can be increased by lowering the time and/or temperature of the heat treatment used to induce phase-separation.

The silicon content of the borate rich phase formed in the manufacture of porous glass precipitates as silica gel during the leaching of the porous glass and this precipitate greatly increases the surface area and the proportion of silicon-bonded hydroxyl groups available for ion exchange with the alkali metal, Group Ib metal and ammonium cations. Thus, an additional technique for increasing the surface area and the proportion of silicon-bonded hydroxyl groups is to start with a composition which will produce large quantities of a silica gel precipitate. This can be accomplished by increasing the amount of silica initially used in the composition from which the glass is made. Any other techniques known by the skilled worker for increasing, or decreasing if desired, the proportion of surface $\equiv$SiOH groups can be used to provide a porous glass having the desired proportion of surface silicon-bonded hydroxyl protons available for exchange by alkali metal, Group Ib metal and/or ammonium cations.

It is preferred to react the porous silicate glass containing silicon-bonded hydroxyl groups with the appropriate salt of the non-radioactive alkali metal, Group Ib and/or ammonium cation at a sufficiently high pH to bring about the exchange of the metal or ammonium cation of the salt with the proton of the silicon-bonded hydroxyl groups but not so high that substantial amounts of the glass dissolves or begins to dissolve. There is a loss of surface area associated with this dissolution of the porous glass at excessively high pH's and thus a loss of silicon-bonded hydroxyl groups and/or silicon-bonded non-radioactive metal or ammonium cation oxy groups. A preferred method of exchanging the protons of silicon-bonded hydroxyl groups is to treat the porous silicate glass with a salt of the alkali metal, and/or Group Ib metal buffered with ammonium hydroxide or otherwise buffered at a pH of about 11 to about 13. It has been found that the buffering with ammonium hydroxide of the primary ion exchange of said non-radioactive metals for the protons of the silicon-bonded hydroxy groups in this manner avoids significant loss of glass or surface area.

The proportion of silicon-bonded alkali metal oxy, Group Ib metal oxy and/or ammonium oxy groups can be regulated by several techniques. Of course, the proportion of silicon-bonded hydroxyl groups in the porous glass will determine generally the maximum amount of silicon-bonded metal or ammonium oxy groups obtainable. Longer times of contact of the alkali metal, Group Ib metal and/or ammonium hydroxides and/or salts with the porous glass will increase the proportion of silicon-bonded metal or ammonium oxy groups. Also, the smaller the particle size of the porous glass, the greater the proportion of silicon-bonded metal oxy or ammonium oxy groups within a given time. Any other suitable technique can be used to regulate the proportion of silicon-bonded metal oxy or ammonium oxy groups to the desired level.

As mentioned above, silica gel containing silicon-bonded non-radioactive metal cation, and/or ammonium cation, oxy groups are available commercially. They can also be obtained by precipitating the silica gel from an aqueous solution of the silicate of the non-radioactive cation such as sodium silicate, potassium silicate, lithium silicate and the like using an appropriate acid, such as hydrochloric acid, nitric acid or the like. The concentration of the silicon-bonded non-radioactive metal cation oxy groups, e.g., silicon-bonded sodium oxy groups in the silica gel can be regulated by regulating the amount of acid used. When larger amounts of acid are used, lower concentrations of the non-radioactive metal cation oxy groups result. The surface area can be regulated by the reaction conditions employed and these techniques are well known in the prior art. The concentration of the silicon-bonded non-radioactive metal cation oxy or ammonium oxy groups can be increased by treating the silica gel with additional solution of the non-radioactive metal cation or ammonium cation as described hereinabove for the porous silicate glass or, preferably the silica gel can be treated with an appropriate non-radioactive metal cation or ammonium cation salt buffered with ammonium hydroxide also as hereinabove described in relation to the porous silicate glass. Furthermore, the type of non-radioactive metal or ammonium cations bonded to silicon through oxy groups can be changed, e.g., NaO groups can be changed to other silicon-bonded non-radioactive metal oxy groups by reacting with the desired non-radioactive metal cation or ammonium salt.

When lithium is employed as the non-radioactive metal cation bonded to silicon through divalent oxygen linkage in the porous silicate glass or silica gel employed in this invention, the presence of large amounts of lithium in the final sintered, fused or collapsed silicate glass or silical gel composition can cause crystallization therein. Notwithstanding such crystal formation, the radioactive cations are chemically bonded to silicon through divalent oxy groups and in such form remain "tied" to the final sintered, fused or collapsed composition.

The porous glass preforms, such as the small, short rods or small sphere or powders, or other particulate form, can be employed to remove radioactive cations from highly dilute solutions of same. For example, solutions containing as little as 1 ppt (part per trillion) based on weight, i.e., 1 wt. part per $10^{12}$ wt. parts solution of radioactive cations can be purified by contacting such solutions with the porous glass preforms or the silica gel in the manner described hereinabove. This contact can take place in an ion exchange column packed with the porous silicate glass or silica gel preforms and the radioactive cation-containing waste solution can then be passed down through the column to remove the radioactive cation content of the solution. Alternatively, the porous glass preforms or silica gel can be added to the radioactive cation-containing solution and stirred therein for a period of time that permits the maximum exchange of the radioactive cation for the silicon-bonded non-radioactive cation. Dilute solutions having less than 0.01 microcurie radioactivity per ml as well as more concentrated solutions, e.g., those having 1 curie or more radioactivity per ml and those solutions between 0.01 microcurie and 1 curie radioactivity per ml are efficiently treated by this invention.

In a typical nuclear reactor there are several sources of radwaste as described hereinabove that must be safely contained. These include highly dilute liquid waste streams which can contain dispersed radioactive solids as well as dissolved radioactive cations; concentrated liquid wastes which can contain radioactive cations, radioactive anions and radioactive solids (such wastes are the result of the boiling down of primary coolant containing boric acid as a chemical shim and the boiling down of used regeneration solutions from the regular ion exchange beds customarily used); and/or radioactive gases such as radioactive krypton and/or radioactive iodine. Therefore, one use of our invention is in the provision of a total radwaste disposal system wherein the porous glass or silica gel of this invention having silicon-bonded alkali metal oxy, Group Ib metal oxy, and/or ammonium oxy groups is packed into an cation exchange column which preferably is a fusible glass column. It is preferred that the porous glass or silica gel be finely divided and sieved to a suitable size to maximize the rate of flow of the radwaste stream through and between the particles of the porous glass or silica gel and to also minimize the ion exchange time. First, the dilute radwaste stream is passed through the column and the radioactive cations in solution are cation exchanged with the alkali metal, Group Ib metal and/or ammonium cations in the porous glass or silica gel to chemically bond the radioactive cations to the glass or silica gel. If the dilute radwaste stream is to be reused as the primary coolant, it is conventional to add lithium ions as a corrosion inhibitor. Therefore, it can be advantageous to utilize a porous glass or silica gel having silicon-bonded lithium oxy groups so that lithium ions (which do not become radioactive as do sodium ions) are released to the coolant stream as radioactive cations are removed from it. Additionally, dispersed radioactive solids in the dilute radwaste stream can be mechanically filtered on the porous glass or silica gel particles in the column as the stream percolates through and between the particles. In order to maintain the ratios of solids in the radwaste stream to the porous glass or silica gel small enough to maintain the filtering action as the solids accumulate on the porous glass or silica gel particles, fresh porous glass or silica gel particles can be added to the column.

After the column has been exhausted of its ion exchange capacity by the dilute liquid radwaste stream, it can be dried and the concentrated liquid radwaste (containing concentrated boric acid, for example, at a temperature of 100° C.) can be added to the column. Thus, the pores of the porous glass or silica gel can be stuffed with the radioactive solids, cations and anions contained by the concentrated radwaste. Excess boric acid then can be washed from between the particles of the porous glass or silica gel using cold water (less than 30° C.) and the particles can be dried to deposit the radioactive solids, cations and anions within the pores of the porous glass or silica gel using techniques taught in U.S. Pat. No. 4,110,096. Thereafter, the column can be evacuated and the radioactive gases can be introduced into the glass column, then the column can be heated to collapse the pores of the porous glass or silica gel and to collapse the glass column thereby immobilizing and containing the exchanged radioactive cations, the radioactive solids on the exterior of the porous glass or silica gel particles, the radioactive solids, anions and/or cations deposited in the pores of the porous glass or silica gel and the radioactive gas contained by the glass column. Suitable pressure differentials can be used to facilitate the collapsing of the glass column. Heating can be continued to cause the porous glass or silica gel particles to stick to each other to further trap interstitial radioactive solids between the particles. Upon cooling there results a highly durable solid which effectively contains the radioactive waste introduced into the glass column.

Some of the nuclear reactor streams may be basic because some elements in the radwaste appear as anions, e.g., chromium, molybdenum, praseodymium and cerium anions, which, of course, have to be immobilized also. One way to accomplish this is to pass the basic radwaste stream through a customary anion exchange resin column. The column is regenerated with non-radioactive base, e.g., ammonium hydroxide. The effluent from said regeneration contains a higher concentration of radioactive (pernicious) elements and is boiled down in a boiler to provide a reduced volume of basic radwaste. When the concentrated basic radwaste in the bottom of the boiler is acidified under reducing conditions, some of the anions, e.g., Cr, Mo, Ce and Pr become cations which can be ion-exchanged with and removed by the above-mentioned porous glass columns. The boiler bottoms are defined as the concentrated solution or raffinate which remains after boiling down the solution and it may contain solids. It can be molecularly stuffed into the porous glass to become a highly durable solid waste product.

There are many other industrial wastes which have to be eliminated from waste streams which, although not radioactive, are very poisonous to humans. For example, it has been well publicized that water bodies have been contaminated in the past with mercury, cadmium, thallium, lead and other heavy metal cations. Often the concentration of such cations in the waste streams is very low, thus presenting the problem of treating large volumes of water containing small amounts of toxic cations. Nevertheless, overall, large quantities of such contaminants do enter the ecosphere. The present invention can purify such waste streams by ion-exchanging into the porous glass or silica gel the poisonous cations which can later be immobilized by heating the glass to collapse the pores.

This invention can be employed for concentrating and immobilizing radioactive cations in a glass or silica gel for extremely long time storage. When applicable, silicate glass or silica gel loaded with radioactive cations bonded to silicon through divalent oxygen linkages can be appropriately package in containers, e.g., steel, concrete, urea-formaldehyde formulations, etc., and buried beneath the earth'e surface or dumped into the ocean. Alternatively, the radioactivity of the sintered glass or silica gel containing the silicon-bonded radioactive cation oxy groups can be utilized in suitable devices or instruments for a variety of purposes, such as, destroying microorganisms, e.g., in the preservation of food, or in sterilizing sewage sludge or for any other purpose where radioactivity can be employed constructively.

The following examples are presented. Unless otherwise specified all solutions are aqueous solutions, the "aqueous ammonium hydroxide" or "NH4OH" used in the Examples contains about 28% $NH_3$, ppm means parts per million parts of solution, ppb means parts per billion parts of solution, ppt means parts per trillion parts of solution, all parts and percentages are on a weight basis and all temperatures are given in degrees Centigrade.

EXAMPLE 1

This example illustrates the preparation of the porous glass that is used in the subsequent examples.

In the subsequent examples, unless otherwise specified, the porous glass that is used is in the form of cylinders 6 to 9 mm in diameter and one to several centimeters in length. The porous glass is formed by the method disclosed hereinabove; that is, a mixture of powders of silica, boric acid, sodium carbonate and potassium carbonate is prepared in such proportions that yield a glass nominally comprising 3.5 mol percent $Na_2O$, 3.5 mol percent $K_2O$, 33 mol percent $B_2O_3$ and 60 mol percent $SiO_2$. The mixture is heated in a Pt crucible up to 1400° C. in an electric furnace and thus is melted into a molten glass which is pulled into rods about 8 mm in diameter and cut to about 2.5 cm long. After cooling, the glass is phase-separated by heat treating at 550° C. for 2 hours and then is leached in a 3N HCl bath at 95° C. for three days. Phase-separation results in two phases; one, a high silica phase and a low silica phase comprising the remaining silica, boron trioxide and alkali metal oxide. Leaching removes the boron-rich phase leaving behind a porous glass comprising about 95 mol percent $SiO_2$ and about 5 mol percent $B_2O_3$ and having interconnected pores and at least about 5.6 mol percent silicon bonded hydroxyl groups.

Subsequent rinsing in water yields a porous glass preform ready for use in the following examples.

EXAMPLES 2-10

In these examples, the porous glass rods prepared in the manner described in Example 1 are subjected to primary ion exchange by immersing them in the primary solutions, correspondingly described in Table 1 below for each of Examples 2–10, for about two to three days at about 20° C. The resulting impregnated rods are then rinsed in deionized water until the rinse water has a pH of about 8. The rinsing step is conducted to remove unreacted primary cations in the pores of the glass and leave only those which are chemically bonded to the glass through silicon-bonded oxygen. The rods are cut in half. One half of the rods are analyzed for the concentrations of the primary cations in the glass rods and said primary ions and concentrations are correspondingly listed in Table 1.

TABLE 1

| | | Primary Ion-Exchange | | |
|---|---|---|---|---|
| Example | Primary Cations | Primary Solution | pH | Concentration of primary cation in glass as weight percent oxide |
| 2 | Na | 25 g NaNO₃ + 50 ml NH₄OH | 12.4 | 1.2 (Na₂O) |
| 3 | " | 25 g NaNO₃ + 50 ml NH₄OH | " | 1.2 " |
| 4 | " | 25 g NaNO₃ + 50 ml NH₄OH | " | 1.2 " |
| 5 | " | 30 g NaNO₃ + 100 ml NH₄OH | " | 2.0 " |
| 6 | " | 30 g NaNO₃ + 100 ml NH₄OH | " | 2.0 " |
| 7 | " | 30 g NaNO₃ + 100 ml NH₄OH | " | 2.0 " |
| 8 | " | 30 g NaNO₃ + 100 ml NH₄OH | " | 2.0 " |
| 9 | K | 6 g KNO₃ + 24 ml NH₄OH + 74 ml H₂O | 12.1 | 4.24 (K₂O) |
| 10 | Cs | 12 g CsNO₃ + 74 ml H₂O + 24 ml NH₄OH | " | 11.97 (Cs₂O) |

The NH₄OH used in Examples 2–10 is a 16 Molar solution.

The glass rods in Examples 2–4 contained 2.4 mol percent Na cations, those of Example 5–8 contained 4 mol percent Na cations, that of Example 9 contained 5.5 mol percent K cations and that of Example 10 contained 5.6 mol percent Cs cations wherein said cations are bonded to silicon through an oxy linkage. A significant yet unmeasured amount of $NH_4^+$ bonded to silicon through oxy linkages in the glass also results. Their presence is demonstrated in Examples 22 and 23. The mole percents of the metal cations were calculated by multiplying the mole percent of the corresponding metal oxides by the number of cations per molecule.

The other half of the rods is immersed in a secondary solution containing different cations for the secondary ion exchange. The secondary ions are listed and the secondary solutions are described in Table 2. Soaking in these secondary solutions is at room temperature for four days.

After soaking in the secondary solutions, the rods are then washed with deionized water for a minimum of three days until the pH of the wash water decreases to about 8. The washing step is conducted to remove unreacted secondary cations in the pores of the glass and leave only those which are chemically bonded to the glass through silicon-bonded oxygen.

The rods are dried in a desiccator at 20° C. for two days and then in vacuo overnight at 0° C. They are subsequently transferred to a furnace and heated to between 860° and 890° C. whereby sintering of the pores occurs yielding solid rods containing the secondary cations chemically bound as an integral part of the structure of the glass.

The rods are then dissolved in hydrofluoric acid and the resulting solutions are analyzed by atomic absorption for the amount of each of the primary and secondary cations chemically bound to the glass prior to dissolution in hydrofluoric acid. The results of these analyses are given in Table 2 below.

TABLE 2

| | Secondary Ion Exchange | | | Analysis of Final Product | | | |
|---|---|---|---|---|---|---|---|
| Example | Secondary Cation | Secondary Solution | pH | Conc. of primary cations as wt % oxide (1) | | Conc. of secondary cations as wt % oxide (2) | |
| 2 | Cs | 5 g CsNO + 50 ml H₂O | 5.6 | 0.2 | (0.4) | 5.3 (Cs₂O) | (2.4) |
| 3 | Nd | 50 g Nd(NO₃)₃·5H₂O + 33 ml H₂O | 1.4 | 0.3 | (0.6) | 0.7 (Nd₂O) | (0.26) |
| 4 | Fe | 30 g Fe(NO₃)₃·9H₂O + 100 ml H₂O | 0.7 | 0.04 | (0.08) | 0.4 (Fe₂O₃) | (0.3) |
| 5 | Sr | 98 ml H₂O + 5 g H₃BO₃ + 16 g Sr(NO₃)₂ | 3.7 | 0.2 | (0.4) | 4.2 (SrO) | (2.5) |
| 6 | Co | 91 ml H₂O + 5 g H₃BO₃ + 22 g Co(NO₃)₂ | 3.8 | 0.2 | (0.4) | 2.7 (CoO) | (2.2) |
| 7 | Cs | 93 ml H₂O + 5 g H₃BO₃ + 15 g CsNO₃ | 4.4 | 0.2 | (0.4) | 9.7 (Cs₂O) | (4.4) |
| 8 | Fe | 87 ml H₂O + 5 g H₃BO₃ 30 g Fe(NO₃)₃·9H₂O | 0.7 | 0.04 | (0.08) | 0.9 (Fe₂O₃) | (0.7) |
| 9 | Cu | 11.2 g Cu(NO₃)₂·98 ml H₂O | 4.5 | 0.32 | (0.4) | 5.3 (CuO) | (4.1) |
| 10 | Na | 5.1 g NaNO₃ 100 ml H₂O | 5.7 | 5.99 | (2.6) | 0.96 (Na₂O) | (2.0) |

(1) Mol % of primary cations bonded to silicon by oxy linkages are given in the parentheses.
(2) Mol % of secondary cations bonded to silicon by oxy linkages are given in the parentheses.

It is noted that the secondary solutions that are used for the secondary cation exchange are on the whole neutral or mildly acidic. As pointed out hereinabove, except for very strongly acid solutions where the pH is below about 2 as in Examples 3, 4 and 8 where less of the secondary cations was retained by the porous glass through ion exchange, there are no restrictions on the types of solutions which may be used in the secondary cation exchange part of the process.

It is also noted from the cesium and iron examples in Tables 1 and 2 that the concentration of the secondary cations which are picked up during the secondary cation exchange part of the process is strongly dependent on the initial concentration of the primary cations that are used for the preceding primary cation exchange.

EXAMPLES 11-19

The procedures described for Examples 2 through 10 are respectively carried out in Examples 11 through 19 except that the secondary cations and secondary solutions are radioactive; otherwise all steps, proportions, materials and conditions are the same. The concentrations of radioactive cations chemically bound in the final glass product are essentially the same as those concentrations correspondingly given in Table 2 for Examples 2-10.

EXAMPLES 20 AND 21

In Example 20, silica gel purchased from DuPont as Ludox HS-40% is poured into a Vycor glass* tube plugged with a filter at the bottom to prevent the silica gel particles from escaping. Analysis of the silica gel (Ludox HS-40%) by atomic absorption before starting shows that it contains 40 wt.% $SiO_2$, 0.41 wt.% titratable alkali as $Na_2O$ less than 0.1 wt.% $Cs_2O$, and a ratio of $SiO_2$ to $Na_2O$ of about 95 to 1. The silica gel contained about 0.4 mol percent silicon-bonded sodium oxy groups. The titratable sodium content is believed to be in the form of silicon-bonded sodium oxy groups and the surface to weight ratio is about 230 $m^2/g$. An essentially neutral solution containing 10 g $CsNO_3$ per 100 ml of water is passed slowly through the silica gel. After several liters are passed through, the silica gel is dried and heated in vacuum about 100° C. until the silica gel is observed to sinter (below 1000° C.) and then it is heated further with a vacuum in the Vycor tube to collapse the tube on the sintered silica gel (which normally occurs below 1300° C.). The final product, after cooling to room temperature is a solid rod with the outside surface consisting of at least 94% silica (i.e., the composition of the Vycor tube), and an interior containing Cs bonded to silicon through oxygen linkage and fused into the structure. Cesium oxide content is analyzed by atomic absorption spectroscopy to be at or above 2 weight percent based on the weight of silica gel. Sometimes the rods break into several pieces, but this does not significantly affect the fixation behavior of the glass.

*Vycor brand silica glass No. 7913 made by Corning Glass Works and containing 96 wt.% silica and 4 wt.% $B_2O_3$.

Example 21 is carried out in exactly the same manner as described above with the only exception being that the $CsNO_3$ is radioactive. There results a final product in which the radioactive Cs is chemically bonded through oxy linkages to silicon of the silica gel within the collapsed Vycor tube which encapsulates and seals the silica gel from the environment.

EXAMPLES 22 AND 23

In each of these examples, porous glass rods measuring 9.3 mm in diameter and 74 mm long are prepared in the manner described in Example 5 by a primary ion exchange treatment of porous glass in a 3.2M sodium nitrate-ammonium hydroxide solution for three days followed by rinsing well with deionized water until the pH of the rinse water was reduced to about 8. The rods so treated contained 2.0 wt.% silicon-bonded sodium oxy groups expressed as $Na_2O$, i.e., 4.0 mol percent sodium cations bonded to silicon through oxy linkages. The wet rods were then immersed in an aqueous solution containing 25 ppm of cesium cation (3.74 mg cesium nitrate per 100 ml $H_2O$) in the case of Example 22 and in an aqueous solution containing 10 ppm strontium cation (2.35 mg strontium nitrate per 100 ml $H_2O$) in the case of Example 23. The glass rods were allowed to remain immersed in the respective solutions at about 25° C. for about three days while being stirred. Samples of each solution were withdrawn periodically for analysis by atomic absorption. These results are given in Table 3 below.

TABLE 3

| Time Elapsed (Hrs.) | Example 22 | | Example 23 | |
|---|---|---|---|---|
| | $Cs^+$ (ppb) (1) | $Na^+$ (ppb) (2) | $Sr^{2+}$ (ppb) (1) | $Na^+$ (ppb) (2) |
| 0 | 23000 | 0-100 | 8900 | 0-100 |
| 4¼ | 196 | 0-300 | 13.9 | 0-100 |
| 7¼ | 119* | 13300 | 9.6 | 14300 |
| 24 | 61* | 26000 | — | 22700 |
| 48 | 10.3* | 38500 | 7.8* | 27000 |

*Subject to possible wide experimental error
(1) By the furnace technique
(2) By the flame technique.

It is noted that the majority of the cesium and strontium cations disappear from the solution before an increase of sodium content in the solution is observed. This suggests that, in addition to the 4 mol percent sodium cations bonded to the porous glass, ammonium cations probably were also bonded to silicon through oxy groups by the primary ion exchange.

The pH of each of the $Cs^+$ and $Sr^{2+}$ solutions was initially 5.8 and after the elapsed time of about 71 hours, the pH of these solutions was about 9.

These results illustrate the effectiveness of porous glass materials in removing cations from very dilute aqueous solutions. In each case of Examples 22 and 23, over 99 percent of the $Cs^+$ ions and $Sr^{2+}$ ions were removed within the very short period of 4½ hours.

EXAMPLES 24 AND 25

The procedures of Examples 22 and 23 are respectively carried out in Examples 24 and 25 except that the $Cs^+$ solution and the $Sr^{2+}$ solution contains radioactive $Cs^+$ and radioactive $Sr^{2+}$ ions, respectively. Otherwise all steps, proportions and conditions are the same. Essentially the same results as are given in Table 3 are obtained, respectively, for Examples 24 and 25.

EXAMPLES 26 AND 27

The procedures of Examples 24 and 25 are respectively carried out in Examples 26 and 27 except that the porous glass rods are replaced by porous glass beads having an average diameter of about 50 to about 100 microns. The beads are prepared by the process described in Example 1 except that instead of pulling the molten glass into rods, it is quenched by pouring it into a cooling bath of water so as to form small fractured glass particles (frit) of varied shapes. The glass particles or frit are then formed into spheres by passing them through a radiant heating zone or high temperature flame where they soften sufficiently to permit surface tension forces to form them into spheres while they are freely moving through the air. They are then cooled rapidly to prevent devitrification. There are thus formed beads or spheres averaging about 50 to about 100 microns in diameter. These beads or spheres are treated in the manner described in Example 5 to provide porous silicate glass beads having sodium oxy groups bonded to silicon on the inner surfaces of the pores thereof.

An ion exchange column is filled with the treated spheres or beads, i.e., the beads having the silicon-bonded sodium oxy groups. A radioactive waste solution containing radioactive Cs+ cations, in Example 26, or containing radioactive Sr²+ ions, in Example 27, is passed through the column. In each case, the aqueous solution coming from the bottom of the column is substantially free of radioactive cations.

EXAMPLE 28

This example illustrates a method for treating primary coolant from a pressurized water nuclear reactor plant. A mixture of powders of silica, boric acid, sodium carbonate and potassium carbonate is prepared in such proportions that yield a glass comprising 3.5 mol percent $Na_2O$, 3.5 mol percent $K_2O$, 33 mol percent $B_2O_3$ and 60 mol percent $SiO_2$. The mixture is heated in a platinum crucible up to 1400° C. in an electric furnace to produce a molten glass which is pulled into rods about 8 mm in diameter and about 2.5 cm long. The glass rods are cooled and the glass is phase-separated by heat treating at about 550° C. for about 110 minutes. The rods are then crushed to form a powder which is sieved through a 32 mesh screen onto a 150 mesh screen. The glass particles collected on the 150 mesh screen are leached in 3N HCl at about 50° C. for about 6 hours to remove the boron-rich phase and leave behind a porous glass comprising about 95 mol percent $SiO_2$ and about 5 mol percent $B_2O_3$. The porous glass has interconnected pores and contains at least about 5 mol percent silicon-bonded hydroxyl groups. The glass particles are then rinsed in deionized water until the rinse water reaches a pH of about 7.

The porous glass powder is then immersed in an approximate 3.2 molar sodium nitrate-ammonium hydroxide aqueous solution for three days and then is rinsed in water until the pH of the rinse water is reduced to about 8. The resulting powder is then placed in an ion exchange column made of the Vycor glass as described in Examples 20 and 21. A radioactive primary coolant from a pressurized water nuclear reactor plant utilizing $UO_2$ fuel clad in stainless steel (containing 4.9 weight percent $^{235}U$) is passed through the column. The primary coolant has the composition given in Table 4 below which lists the radionuclide, the probable source, the probable form and the average concentration in microcuries per milliliter. The cationic radionuclides ion-exchange with sodium cations bonded to silicon through oxy groups in the porous silicate glass powder.

TABLE 4

| Radio-nuclide | Probable Source[a] | Probable Form[b] | Average Concentration (μCi/ml) | Average Concentration (ppb) |
|---|---|---|---|---|
| $^3H$ | (1),(2) | Water, gas | 2.4 | 0.249 |
| $^{14}C$ | | | $1.2 \times 10^{-5}$ | $2.69 \times 10^{-3}$ |
| $^{24}Na$ | (1) | Cation | $1.9 \times 10^{-2}$ | $2.18 \times 10^{-6}$ |
| $^{32}P$ | | | $3.3 \times 10^{-5}$ | $1.16 \times 10^{-8}$ |
| $^{35}S$ | | | $3 \times 10^{-6}$ | $7.08 \times 10^{-8}$ |
| $^{51}Cr$ | (1) | Anion | $3.7 \times 10^{-4}$ | $4.02 \times 10^{-6}$ |
| $^{54}Mn$ | (1) | Cation, s | $2.7 \times 10^{-4}$ | $3.38 \times 10^{-5}$ |
| $^{55}Fe$ | (1) | Cation, s | $1.9 \times 10^{-4}$ | $7.6 \times 10^{-5}$ |
| $^{59}Fe$ | (1) | Cation, s | $1.0 \times 10^{-5}$ | $2.03 \times 10^{-7}$ |
| $^{57}Co$ | (1) | Cation, s | $1.2 \times 10^{-6}$ | $1.42 \times 10^{-7}$ |
| $^{58}Co$ | (1) | Cation, s | $4.7 \times 10^{-4}$ | $1.48 \times 10^{-5}$ |
| $^{60}Co$ | (1) | Cation, s | $7.7 \times 10^{-5}$ | $6.81 \times 10^{-5}$ |
| $^{63}Ni$ | (1) | Cation, s | $8.0 \times 10^{-6}$ | $1.30 \times 10^{-4}$ |
| $^{64}Cu$ | (1) | Cation, Anion, s | $5.4 \times 10^{-4}$ | $1.41 \times 10^{-7}$ |
| $^{89}Sr$ | (2) | Cation | $2.8 \times 10^{-6}$ | $9.93 \times 10^{-8}$ |
| $^{90}Sr$ | (2) | Cation | $4 \times 10^{-7}$ | $2.84 \times 10^{-6}$ |
| $^{91}Sr$ | (2) | Cation | $9.8 \times 10^{-5}$ | $2.76 \times 10^{-8}$ |
| $^{90}Y$ | (2) | s | | |
| $^{91}Y$ | (2) | s | | |
| $^{92}Y$ | (2) | s | | |
| $^{95}Zr$ | (1),(2) | s | $1.7 \times 10^{-5}$ | $8.06 \times 10^{-7}$ |
| $^{95}Nb$ | (1),(2) | s | $1.9 \times 10^{-5}$ | $4.83 \times 10^{-7}$ |
| $^{99}Mo$ | (1),(2) | Anion | $1.2 \times 10^{-4}$ | $2.54 \times 10^{-7}$ |
| $^{103}Ru$ | (2) | s | 0 | |
| $^{106}Ru$ | (2) | s | 0 | |
| $^{122}Sb$ | (1) | s | $1.0 \times 10^{-4}$ | $2.62 \times 10^{-7}$ |
| $^{124}Sb$ | (1) | s | $2.0 \times 10^{-5}$ | $1.16 \times 10^{-6}$ |
| $^{132}Te$ | (2) | Anion, s | | |
| $^{131}I$ | (2) | Anion | $4.6 \times 10^{-5}$ | $3.71 \times 10^{-6}$ |
| $^{132}I$ | (2) | Anion | | |
| $^{133}I$ | (2) | Anion | $6.2 \times 10^{-4}$ | $5.5 \times 10^{-7}$ |
| $^{135}I$ | (2) | Anion | $9 \times 10^{-4}$ | $2.60 \times 10^{-7}$ |
| $^{134}Cs$ | (2) | Cation | $4.7 \times 10^{-7}$ | $3.62 \times 10^{-7}$ |
| $^{136}Cs$ | (2) | Cation | 0 | |
| $^{137}Cs$ | (2) | Cation | $1.1 \times 10^{-6}$ | $1.26 \times 10^{-5}$ |
| $^{140}Ba$ | (2) | Cation | $4.7 \times 10^{-6}$ | $6.45 \times 10^{-8}$ |
| $^{141}Ce$ | (2) | Anion, s | 0 | |
| $^{143}Ce$ | (2) | Anion, s | 0 | |
| $^{144}Ce$ | (2) | Anion, s | 0 | |
| $^{143}Pr$ | (2) | Anion, s | | |
| $^{110m}Ag$ | (1) | s | $1.2 \times 10^{-5}$ | $2.52 \times 10^{-6}$ |
| $^{181}Hf$ | (1) | s | $6 \times 10^{-6}$ | $3.70 \times 10^{-7}$ |
| $^{182}Ta$ | (1) | s | $2.5 \times 10^{-5}$ | $4.01 \times 10^{-6}$ |
| $^{183}Ta$ | (1) | s | $6.2 \times 10^{-5}$ | $4.34 \times 10^{-7}$ |
| $^{185}W$ | (1) | s | $1.2 \times 10^{-5}$ | $1.28 \times 10^{-6}$ |
| $^{187}W$ | (1) | s | $3.7 \times 10^{-4}$ | $5.30 \times 10^{-7}$ |
| $^{85m}Kr$ | (2) | Gas | | |
| $^{85}Kr$ | (2) | Gas | | |
| $^{88}Kr$ | (2) | Gas | | |
| $^{133}Xe$ | (2) | Gas | $8.9 \times 10^{-5}$ | $4.78 \times 10^{-8}$ |
| $^{135}Xe$ | (2) | Gas | $9 \times 10^{-5}$ | $3.54 \times 10^{-8}$ |

[a] (1) Neutron activation products of nuclides from fuel cladding, constrution material, and water.
(2) Leakage from fuel. Mostly fission products.
[b] Gas: presumably as dissolved gas.
s: insoluble solids.

The radioactive cations of the radionuclides listed in Table 4, cation-exchange with sodium cations bonded to silicon through oxy groups in the porous glass thereby binding the radionuclides to the porous glass through said silicon-bonded oxy groups and releasing sodium cations to the coolant solution. The insoluble radioactive solids in the coolant also filter out on the external surfaces of the porous glass particles. Additional porous glass particles can be added to increase the filtering capacity of the ion exchange column as the insoluble solids build-up in the column. Under some conditions, mainly dependent on existing governmental regulations, the porous silicate glass containing bound cationic radionuclides may be disposed and/or buried or suitably containerized often times in steel and/or concrete or mixed with cement powder or urea-formaldehyde formulations and "set" therein and thereafter disposed and/or buried. The particulate porous glass can be heated to collapse the pores thereof as described herein.

The anionic radionuclides are not substantially removed in the column and pass with the coolant through the column. The anionic radionuclides can be subsequently removed by treatment with conventional anionic exchange resins. Upon regeneration of the conventional anion exchange resin after it becomes loaded, the regenerant solution containing the anionic radionuclides can be concentrated by evaporation and the resulting concentrate can be molecularly stuffed into the pores of the porous glass in the ion exchange column after said porous glass had become substantially loaded with silicon-bonded radionuclide cation oxy groups. It is preferred to first dry the loaded porous glass so that the anionic radionuclide concentrate can readily enter the pores of the porous glass. The anionic radionuclides can be precipitated or deposited within the pores of the porous glass by the careful drying procedures disclosed in U.S. Pat. No. 4,110,096. Thereafter, the porous glass particles can be heated to collapse the pores thereof. Thereafter, if desired the column can be heated to collapse the Vycor glass around the particles thereby enveloping the filtered solids and the glass particles containing the cationic and anionic radionuclides within the Vycor glass column. While the glass column cracks because of differential thermal contraction it still contains and further immobilizes the radioactive materials and forms a product that is many times more durable than cement or metal drumsheretofore used. There is thus provided a durable package of concentrated radionuclides which is highly resistant to leaching by water or other fluids.

As illustrated in Example 28, liquid radwaste that must be satisfactorily treated and disposed of can be highly dilute. The volume of dilute radwaste treated with a given amount of ion exchange porous glass or silica gel pursuant to this invention can be practically unlimited before all the available exchange sites (i.e. silicon-bonded alkali metal oxy, Group Ib metal oxy and/or ammonium oxy groups) in the porous silicate glass or silica gel are filled by radioactive cations. For example, the weight of the dilute liquid radwaste described in Example 28 that could be expected to be treated before exhausting all exchange sites would be of the order of $10^9$ or more times the weight of the ion exchange porous glass or silica gel employed. Furthermore, it could be expected that other parts of the system would require overhaul, e.g., repair or replacement of pumps or piping or other equipment, before the ion exchange silicate glass or silica gel becomes exhausted. Consequently, it is quite possible, if not probable, that the radioactivity of the resulting porous glass or silica gel when disposed of may never reach 1 millicurie or even 1 microcurie per cc. of the glass or silica gel. In the absence of malfunction requiring overhaul of the other parts of the radwaste treatment system, 100 or less to $10^9$ or more, preferably 100 to $10^6$, weight parts of radwaste can be treated for each weight part of porous silicate glass or silica gel having silicon-bonded alkali metal oxy, Group Ib metal oxy and/or ammonium oxy groups pursuant to this invention.

EXAMPLE 29

A molten glass having the composition described in Example 1 was produced by heating said composition in a platinum crucible up to 1400° C. in an electric furnace. The molten glass is then pulled to form rods about 8 mm in diameter and about 2.5 cm long. After cooling the glass rods were phase-separated by heat treating at 550° C. for 110 minutes and then were crushed and sieved through a 32 mesh screen onto a 150 mesh screen. The glass particles collected on the 150 mesh screen were leached in 3N HCl at 50° C. for 6 hours and then were rinsed in deionized water until the rinse water reached a pH of about 7.

Two solutions were prepared as follows:
Solution 1 was a 0.5M NaOH aqueous solution made from 2 grams sodium hydroxide and 100 ml water and had a pH of greater than 13.
Solution 2 was 0.5M sodium nitrate aqueous solution and was made from 4.3 grams sodium nitrate, 25 ml ammonium hydroxide and 75 ml water and had a pH of about 12.1.

The particulate porous glass produced as described above were divided into four portions and the portions were treated as follows:
Portion 1 was allowed to remain in pure water.
Portion 2 was immersed in solution 1.
Portion 3 was immersed in solution 1.
Portion 4 was immersed in solution 2.

After two hours, portions 2, 3 and 4 were rinsed until the rinse water become neutral, i.e., reached a pH of about 7. Portion 2 was then immersed in 3N HCl for two hours followed by rinsing until neutral. Portions 2 and 3 were thus treated by the procedure described in U.S. Pat. No. 3,549,524 (col. 4, lines 65–75) for removing colloidal silica precipitate from the pores of porous glass. Portion 2 followed the directions of the patent which called for immersion in aqueous hydrochloric acid whereas portion 3 did not include the hydrochloric acid immersion.

All four portions were dried and analyzed by atomic absorption spectroscopy for sodium content. The analytical results are given in Table 5 below.

TABLE 5

| Portion No. | Na (ppm) | Na$_2$O (ppm) | Mol % Na Cation |
|---|---|---|---|
| 1 | 202 | 272 | 0.054 |
| 2 | 510 | 687 | 0.136 |
| 3 | 720 | 990 | 0.198 |
| 4 | 14,800 | 19,900 | 3.98 |

This example illustrates the ease of introducing the silicon-bonded sodium oxy groups using the buffering techniques exemplified by solution 2. It also illustrates that a sufficient amount of such groups can be readily obtained by the buffering techniques whereas extra precautions should be taken in the formation of such groups with the unbuffered alkali metal hydroxide in order to provide a sufficient level of such groups without undue attack on the porous glass. The proportions of silicon-bonded sodium oxy groups provided by portions 1, 2 and 3 are inadequate to provide a substantial amount of cation exchange with radioactive cations in the present invention.

EXAMPLE 30

Five aqueous sodium hydroxide solutions were prepared as identified in Table 6 below which lists the concentration and pH of each.

TABLE 6

| Solution No. | Concentration (M) | pH |
|---|---|---|
| A | 0.001 | 11 |
| B | 0.01 | 12 |
| C | 0.1 | 13 |
| D | 1.0 | 14 |
| E | 3.0 | 14 |

Ten porous glass rods were produced as described in Example 1. Pairs of glass rods were immersed in each of the five solutions. Periodically one rod of the immersed glass rods was removed from each solution and was analyzed after rinsing until the rinse water became approximately neutral. Before analysis, the samples were dried and then analyzed by atomic absorption spectroscopy for sodium content. The analytical results are given in Table 7 below.

TABLE 7

| Immersion Time (Hrs.) | Amount of Na+ Bound to Porous Glass | | | | | | D | E |
|---|---|---|---|---|---|---|---|---|
| | A | | B | | C | | | |
| | ppm | Mol % | ppm | Mol % | ppm | Mol % | | |
| 22 | — | — | — | — | — | — | | 77% dissolved |
| 24 | 233 | | 1800 | | 4833 | | | Completely dissolved |
| 48* | 309 | | 2056 | | 7020 | | — | |

*May contain some unbound Na+ due to incomplete rinsing before analysis.

This example, as regards solution C, illustrates the technique for producing porous silicate glass containing effective proportions of sodium cation bonded through oxy linkages to silicon by immersion in aqueous sodium hydroxide of a suitable concentration and for a suitable period of immersion.

Solution B provides porportions of silicon-bonded sodium oxy groups that are on the low side but, nevertheless might find use in certain applications of the present invention.

Solutions D and E obviously attacked the porous glass and resulted in complete dissolution thereof within 24 hours immersion time.

Solution A even after 48 hours was ineffective in providing sufficient sodium cations bonded to silicon through oxy linkages. This example illustrates that one skilled in the art utilizing proper controls can produce suitable cation exchange porous glass forms useful in this invention by unbuffered alkali metal hydroxide immersion techniques.

EXAMPLES 31 AND 32

Porous glass rods having silicon-bonded sodium oxy groups were produced by the procedures described in Examples 22 and 23 and were immersed in an aqueous solution of neodynium nitrate which was stirred at about 25° C. for about 22 hours. Periodically samples of the solution were withdrawn and analyzed. The results are given in Table 8 below and illustrate the efficiency of the porous glass in removing neodynium cations from aqueous solution pursuant to this invention.

TABLE 8

| Time | $Nd^{3+}$ (ppb) | $Na^+$ (ppb) |
|---|---|---|
| 0 | 25,700 | 0–100 |
| ¼ | 13,400 | — |
| 1 | 5,800 | — |
| 2 | 1,500 | — |
| 22 | 1,000* | 32,000 |

*below the measuring capacity of the analytical procedure used.

In Example 32, the porous glass resulting from the above-described Example 31 was heated to collapse the pores.

EXAMPLES 33 AND 34

Two porous glass rods one inch and a half long each, were prepared as previously described to contain about 1.5 wt. % sodium cations bonded to silicon through oxy groups. One of the rods was immersed in 80 ml of a solution containing 25 ppm cupric cation made from 6.7 milligram of $CuCl_2.2H_2O$ in 100 ml aqueous solutions. Initially, the cupric ion content of the solution was measured and found to be 22.3 ppm and the sodium ion content was found to be 0.09 ppm. After four hours immersion the cupric cation content was measured and found to be 2.2 ppm and the sodium cation content was found to be 18.4 ppm illustrating that the cupric cation exchanged with the sodium cation.

The second porous glass rod was immersed in a solution containing nominally 10 ppm $Sr^{2+}$ made from 3.04 milligram $SrCl_2.6H_2O$ in a 100 ml aqueous solution. Initially, the $Sr^{2+}$ content of the solution was measured and found to be 10.7 and the sodium content was 0.302. After four hours immersion, the $Sr^{2+}$ content had dropped to 0.149 ppm and the sodium cation content had increased to 17.1 ppm.

EXAMPLES 35, 36 AND 37

Three one inch long porous glass rods prepared as described in Example 1, were immersed in one of the three solutions as described below. In Example 35, the rod was immersed for 115 hours at 25° C. in a solution made from 10.4 g lithium nitrate, 12 ml aqueous ammonium hydroxide and 38 ml of water. In Example 36, the solution was made from 8.5 g of silver nitrate, 25 ml aqueous ammonium hydroxide and 74 ml $H_2O$ and the immersion was 66 hours at 25° C. In Example 37, the solution was made from 8.5 g $CuCl_2.2H_2O$ 25 ml aqueous ammonium hydroxide and 75 ml of water and the immersion time was 66 hours at 25° C. All rods were then thoroughly rinsed and each was immersed in a separate 10 ppm $Sr^{2+}$ solution made from $Sr(NO_3)_2$. In Example 35, the initial $Sr^{2+}$ content was measured and found to be 9.65 ppm and after six hours immersion it was found to be 0.009 ppm while the lithium ion content after six hours immersion was found to be 7.77. In Example 36, the initial $Sr^{2+}$ content was measured and found to be 9.65 ppm and after six hours immersion is had dropped to 0.079 ppm while the silver ion content of the solution after six hours increased to 82 ppm. In Example 37, the initial $Sr^{2+}$ content was measured and found to be 9.65 ppm and after six hours immersion, it had dropped to 0.07 ppm while the cupric ion content after six hours immersion was found to be 0.137 ppm. The disappearance of $Sr^{2+}$ ions from the solution in Example 37 without concomitant appearance of substantial amounts of cupric ion suggests that silicon-bonded ammoinium oxy groups first cation-exchanged with the $Sr^{2+}$ ions and then when more $Sr^{2+}$ ions are added to the immersion solution, cupric cations will be exchanged from the glass and then begin to appear in substantial amounts in the immersion solution.

EXAMPLES 38 AND 39

One one inch long porous glass rod prepared as described in Example 1 was immersed in a solution made from 8.5 g $CuCl_2.2H_2O$, 25 ml aqueous ammonium hydroxide and 74 ml $H_2O$ for 66 hours at 25° C. In Example 39, an identical porous glass rod was immersed in a solution made from 30 g sodium nitrate, 25 ml aqueous ammonium hydroxide and 75 ml water for three days at 25° C. Each rod was then immersed in a 500 ppm $Sr^{2+}$ solution prepared from 0.6 g stronium nitrate and 500 ml of water. In Example 38, the initial $Sr^{2+}$ content was measured and was found to be 460 ppm and after four hours immersion it had dropped to 380 ppm and after 49 hours immersion it had dropped to 119 ppm. In Example 39, the initial $Sr^{2+}$ was measured and found to be 470 ppm and it dropped to 340 ppm after four hours immersion.

EXAMPLES 40 AND 41

Two one inch long porous glass rods each having a surface area of about 8.3 $cm^2$, prepared in a manner similar to that given in Example 1 were immersed in the following aqueous solutions: In Example 40, the immersion was for 115 hours in a solution of 10.4 g lithium nitrate, 12 ml aqueous ammonium hydroxide and 38 ml water. In Example 41, the immersion was for three days in a solution of 30 g sodium nitrate, 25 ml ammonium hydroxide and 75 ml of water. After immersion in each example, the glass rods were thoroughly rinsed with water and immersed in a nominally 100 ppm $Sr^{2+}$ solution made by mixing 20 ml of the 500 ppm $Sr^{2+}$ solution described in Examples 38 and 39 with 80 ml of water. In Example 40, the initial $Sr^{2+}$ content was measured and found to be about 93 and after four hours immersion, it was found to have dropped to about 23. In Example 41, the initial $Sr^{2+}$ content was measured and found to be 93 and after four hours immersion it had dropped to 13.

For reasons of safety all simulated radwaste solutions used in the Examples were actually non-radioactive; however, radioactive solutions of the same kind can be substituted and concentrated and encapsulated in accordance with the foregoing Examples.

EXAMPLE 42

This example illustrates a method for treating primary coolant from a pressurized nuclear reactor plant. A mixture of powders of silica, boric acid, sodium carbonate and potassium carbonate is prepared in such proportions that yield a glass comprising 3.5 mol percent $Na_2O$, 3.5 mol percent $K_2O$, 33 mol percent $B_2O_3$ and 60 mol percent $SiO_2$. The mixture is heated in a platinum crucible up to 1400° C. in an electric furnace to produce a molten glass which is pulled into rods about 8 mm dia and about 25 cm long. The glass rods are cooled and the glass is phase separated by heat-treating at about 550° C. for 110 minutes. The rods are then crushed to form a powder which is sieved through a 32 mesh screen onto a 150 mesh screen. The glass particles collected on the 150 mesh screen are leached in 3N HCl at about 50° C. for about 6 hours to remove the boron-rich phase and leave behind a porous glass comprising about 95 mol percent $SiO_2$ and about 5 mol percent $B_2O_3$. The porous glass has interconnected pores and contains at least about 5 mol percent silicon-bonded hydroxyl groups. The glass particles are then rinsed in deionized water until the rinse water reaches a pH of about 7.

The porous glass powder is then immersed in an approximate 3.2 molar lithium nitrate-ammonium hydroxide (1 part ammonium hydroxide to 3 parts water) aqueous solution for six hours and then is rinsed in water until the pH of the rinse water is reduced to about 8. The resulting powder is then placed in an ion exchange column made of the Vycor glass as described in Examples 20 and 21. A radioactive primary coolant from a pressurized water nuclear reactor plant utilizing $UO_2$ fuel clad in stainless steel (containing 4.9 weight percent $^{235}U$) is passed through the column. The primary coolant has a composition of 100 ppm Boron, 1 ppm $^7$Lithium, approximately 100 ppb Silica, and the radionucleides listed in Table 4. Table 4 lists the radionuclide, the probable source, the probable form and the average concentration in microcuries per milliliter. The cationic radionuclides ion-exchange with the lithium cations bonded to silicon through oxy groups in the porous silicate glass powder thereby binding the radionuclides to the porous glass through said silicon-bonded oxy groups and releasing lithium cations to the coolant solution. The insoluble radioactive solids in the coolant also filter out on the external surfaces of the porous glass particles. Additional porous glass particles can be added to increase the filtering capacity of the ion exchange column as the insoluble solids build-up in the column. Under some conditions, mainly dependent on existing governmental regulations, the porous silicate glass containing bound cationic radionuclides may be disposed and/or buried or suitably containerized often times in steel and/or concrete or mixed with cement powder or urea-formaldehyde formulations and "set" therein and thereafter disposed and/or buried. The particulate porous glass can also be heated to collapse the pores thereof as described herein.

The anionic radionuclides are not substantially removed in the column and pass with the coolant through the column. The anionic radionuclides can be subsequently removed by treatment with conventional anionic exchange resins. Upon regeneration of the conventional anion exchange resin after it becomes loaded, the regenerant solution containing the anionic radionuclides can be concentrated by evaporation and the resulting concentrate can be molecularly stuffed into the pores of the porous glass in the ion exchange column after said porous glass had become substantially loaded with silicon-bonded radionuclide cation oxy groups. It is preferred to first dry the loaded porous glass so that the anionic radionuclide concentrate can readily enter the pores of the porous glass. The anionic radionuclides can be precipitated or deposited within the pores of the porous glass. The anionic radionuclides can be precipitated or deposited within the pores of the porous glass by the careful drying procedures disclosed in U.S. Pat. No. 4,110,096. Thereafter, the porous glass particles can be heated to collapse the pores thereof. Thereafter, if desired the column can be heated to collapse the Vycor glass around the particles thereby enveloping the filtered solids and the glass particles containing the cationic and anionic radionuclides within the Vycor glass column. While the glass column cracks because of differential thermal contraction it still contains and further immobilizes the radioactive materials and forms a product that is many times more durable than cement or metal drums heretofore used. There is thus provided a durable package of concentrated radionuclides which is highly resistant to leaching by water or other fluids.

EXAMPLE 43

This example illustrates the ability to reduce radioactive ion concentrations down to levels as low as 0.01 ppt (i.e., $\sim 10^{-14}$ g/g). A porous rod, 2.5 cm long and 8 mm. in diameter, prepared in the manner described in Example 1 was subjected to a primary ion exchange by immersing it in a solution of 30 g $NaNO_3$ and 100 ml $NH_4OH$ for 3 days at 20° C. The resulting impregnated rod was then washed in deionized water until the rinse water has a pH of about 8. It was then soaked in a stirred secondary solution containing radioactive $Sr^{90}$ which is prepared as follows. One-hundred microcuries of carrier-free $Sr^{90}$ in approximately ⅔ ml of 0.5 NaCl purchased from New England Nuclear Corporation was diluted to 100 ml (1 μCi/ml) with demineralized water. An aliquot of this solution was further diluted to prepare a 50 ml soaking solution with a $Sr^{90}$ concentration of 80 nCi/ml. The soaking solution was then equilibrated by stirring for 20 hours in a 100 ml PTFE beaker at 28° C. The soak solution pH was measured to be 7.0. After equilibration, the porous glass rod was introduced into the solution and soaked for approximately 26 hours.

Measurements of the $Sr^{90}$ and $Y^{90}$ concentrations were taken before adding the porous glass rod and at various intervals after soaking begins. The $Sr^{90}$ and $Y^{90}$ concentration in the solution were determined by measuring the $\beta$-activity of planchets made by evaporating a 0.1 ml aliquot of the solution from a clean copper disc 1 in. in diameter by 0.022 in. thick. The solution was thus sampled every 40 minutes for the first 12 hours.

Each sample was counted sequentially with two background and two standardization planchets to permit compensation for long term drift in the detector response. Each count was first corrected for the detector resolving time, then the sample counts were normalized to the standards and backgrounds were subtracted to obtain normalized net count rates.

In order to separate the Sr-90 and Y-90 behavior, the well known Bateman equations were used to relate the quantities of the individual members of a radioactive decay chain. For Sr/Y-90 the chain takes the simple form:

$$A \xrightarrow{\lambda_A} B \xrightarrow{\lambda_B} C \text{ (Stable)}, \quad (1)$$

where A, B and C are the quantities of Sr-90, Y-90 and Zr-90. The quantities of A and B present at any time t are given by $$A = A_o e^{-\lambda_A t} \quad (2)$$

$$B = \lambda_A (\lambda_B - \lambda_A)^{-1}(e^{-\lambda_A t} - e^{-\lambda_B t})A_o + B_o e^{-\lambda_B t}.$$

where $\lambda_A$ and $\lambda_B$ are the reciprocal time constants for the decay of Sr-90 and Y-90 respectively and $A_o$ and $B_o$ are the initial concentrations respectively. The detector response ($\Sigma$) (net of background and corrected for resolving time) to a sample containing an unknown mixture of the two radioactive nuclides is $$\Sigma = D_A + D_B \quad (3)$$

where $$D_A = \eta_A \lambda_A e^{-\lambda_A t} \quad (4)$$

$$D_B = \eta_B \lambda_A \lambda_B (\lambda_B - \lambda_A)^{-1}(e^{-\lambda_A t} - e^{\lambda_B t})A_o + \eta_B \lambda_B B_o e^{-\lambda_B t}$$

where $n_A$ and $n_B$ are the counting efficiencies of Sr-90 and Y-90 respectively. If the sample is counted at two different times, Eq. (3) yields a pair of simultaneous equations in $A_o$ and $B_o$, the quantities of the two isotopes present at time $t_o$.

To determine $n_A$ and $n_B$ for use in Eq. 4 the following procedure was used. The average efficiency $$n = \frac{n_A + n_B}{2}$$

of the detector for the beta particles from a mixture of Sr-90 and Y-90 was determined to be 0.33172. The calculated Sr-90 activity $n_A$, is essentially independent of $n_B$. The exact value of $n_B$ was not known but from other detector calibrations $n_A/n_B$ should lie between 0.5 and 0.8. Since a precise $n_B$ was not crucial for an adequate understanding the data f=0.6 was chosen.

The results of the experiment were as follows.

Figure 2:
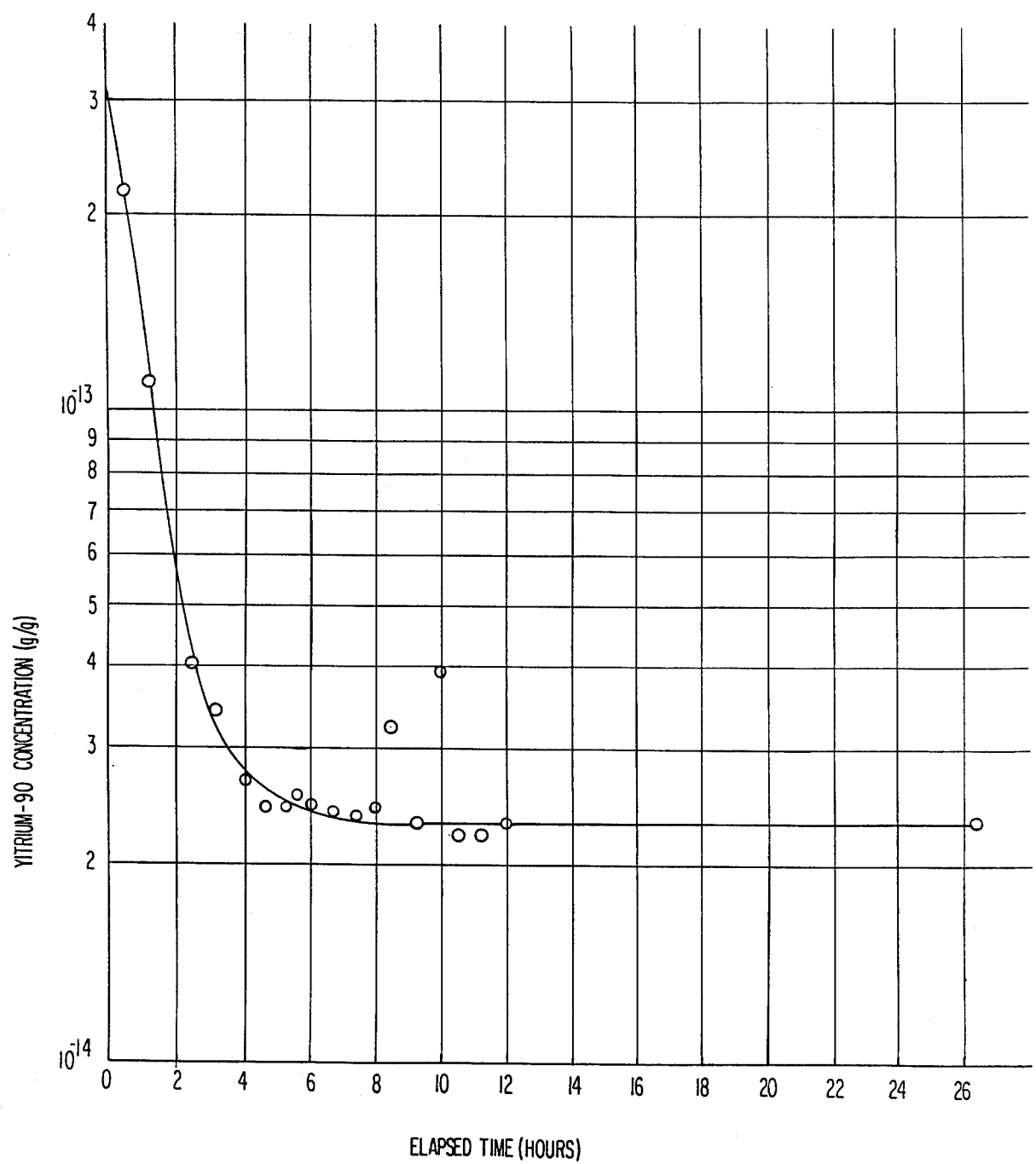

A. Mass Concentration. The mass concentration of an isotope in solution is obtained by dividing the activity concentration by the specific activity (141 Ci/g for Sr-90 and $5.44 \times 10^5$ Ci/g for Y-90) and by the solution density (essentially unity). Table 9 and FIGS. 1 and 2 show the mass concentration in the solution vs. time for Sr-90 and Y-90, respectively.

The Sr-90 mass concentration decreased approximately exponentially for about 6 h, followed by a transition to equilibrium. At 18 h the concentration was 10% above equilibrium and the transition appeared to be complete when the final datum was taken at 26.5 h. The Y-90 mass concentration decreased approximately exponentially for about 3 h, followed by transition to what appears to be equilibrium.

B. Concentration Reduction. The concentration of strontium in solution was reduced from $1.3 \times 10^{-9}$ g/g to $1.9 \times 10^{-12}$ g/g, a reduction by a factor of 693. The concentration of yttrium in solution was reduced from $3.2 \times 10^{-12}$ g/g to $2.3 \times 10^{-14}$ g/g, a reduction by a factor of 137.

TABLE 9

REDUCTION IN CATION CONCENTRATION ($Sr^{90}$ AND $Y^{90}$) OF SOLUTION BY A SODIUM DOPED POROUS GLASS PHASIL ROD USED FOR ION EXCHANGE.

| SOAK TIME (hours) | $Sr^{90}$ CONCENTRATION IN SOLUTION ($10^{-6}$ g/g sol) | $Y^{90}$ CONCENTRATION IN SOLUTION ($10^{-13}$ g/g sol) |
|---|---|---|
| 0 | 1.3 | 3.2 |
| 0.7 | 0.9 | 2.2 |
| 1.4 | 0.54 | 1.2 |
| 2.0 | 0.32 | 0.56 |
| 2.7 | 0.185 | 0.40 |
| 3.4 | 0.10 | 0.35 |
| 4.0 | 0.055 | 0.27 |
| 4.7 | .034 | 0.25 |
| 5.4 | .0185 | 0.25 |
| 5.6 | .0150 | 0.26 |
| 6.0 | .012 | 0.25 |
| 6.6 | .0076 | 0.24 |
| 7.4 | .0058 | 0.24 |
| 8.0 | .0041 | 0.25 |
| 8.6 | .0057 | 0.32 |
| 9.4 | .0037 | 0.23 |
| 10 | .0031 | 0.39 |
| 10.6 | .0032 | 0.22 |
| 11.4 | .0028 | 0.22 |
| 12.0 | .0032 | 0.23 |
| 26.6 | .0019 | 0.23 |

EXAMPLE 44

A particulate porous glass, prepared as in Example 1, except that between heat treatment and leaching the rods were mechanically crushed and the powder was sieved. The resulting porous glass powder with silicon bonded hydroxyl groups on the pore surface, is soaked in a solution of 30 g $NaNO_3$, 25 ml $NH_4CH$ and 75 ml water at 20° C. for 3 hours to allow $Na^+$ ions to exchange for protons from the silicon-bonded hydroxyl groups on the glass surface. The resulting Na powder then fills a polypropylene column of cross-section 3.8 $cm^2$ up to a height of 10.5 cm. The column support for the glass is a 10 $\mu$m polypropylene filter disc. The head height is measured from the top of the glass in the column to the midpoint of the feed solution container. All tests were conducted with head height of 95.3 cm of water. Two runs were made using a size of 0.710–0.355 mm for the glass powder. The results are summarized:

| Run | Flow Rate (cm³/min) | Feed Soln [Sr] (ppm) | Vol effluent (cm³) | Sr removed (g) | Na released (g) | Si lost (g) |
|---|---|---|---|---|---|---|
| 1 | 18 | 20 | 3867 | .0773 | .111 | .03 |
| 2 | 180 | 100 | 5685 | .36 | .18 | .03 |

For run 2 the Na:Sr atom-atom ratio is 2:1 and for run 1 it is 5.6:1. The high value for run 1 may be due to incomplete washing of the glass. The Si release produced an average concentration of 3–5 ppm in the effluent. For run 1, after 4 hours and 46 minutes, there was no sign of break-through. The maximum Sr concentration in the effluent being 0.005 and 0.013 ppm respectively with average concentrations of 0.003 and 0.005 ppm.

Run 2 began to show signs of breakthrough after ~1000 cm³ of solution were passed and for this reason is most useful in calculating column characteristics. If we assume that almost all of the capacity of the column was exhausted by the end of the experiment the total capacity can be calculated as $$cap(\text{meq/cm}^3) = \frac{(.36 \text{ g Sr})(2 \text{eq Sr/mol Sr})}{(87.62 \text{ g Sr/mol Sr})(39.5 \text{ cm}^3 \text{ glass})} (1000 \text{ meq/eq}) = .21 \text{ meq/cm}^3$$

In conclusion starting with a Sr concentration of 20 ppm the glass column used in runs 1 and 2 show initial leakage rates of 103 ppb and average leakage rates of 3–5 ppb.

What is claimed is:

1. Process which causes the proton (H+) of silicon-bonded hydroxyl groups on the internal surfaces of porous silicate glass to undergo ion-exchange reaction without occurrence of substantial dissolution of the glass during the reaction which comprises:
   (a) impregnating a porous silicate glass characterized by at least 75 mol percent $SiO_2$, an interconnecting pore structure, and silicon-bonded hydroxyl groups on its surfaces,
   (b) with a liquid containing non-radioactive alkali metal cations, non-radioactive Group I(b) metal cations, ammonium cations, or mixtures thereof,
   (c) said liquid buffered with non-radioactive ammonium cations to maintain a pH in the range of about 11 to about 13,
   (d) for a period of time to provide a distribution of said non-radioactive cations within the interconnected pores of said glass, said cations being bonded to silicon through divalent oxy groups.

2. The process of claim 1 wherein said ion-exchanged porous glass contains at least about 0.3 mol percent to about 10 mol percent alkali metal cations bonded to silicon through divalent oxy groups.

3. The process of claim 1 or 2 wherein potassium cation is bonded to surface silicon through divalent oxy groups.

4. The process of claim 1 or 2 wherein sodium cation is bonded to surface silicon through divalent oxy groups.

5. The process which comprises reacting the ion-exchange porous silicate glass containing bonded non-radioactive cations defined in claim 1 or 2 with a liquid containing toxic cations, said toxic cations being capable of displacing said non-radioactive cations to provide a distribution of internal surface silicon-bonded toxic cation oxide groups within the pores of said glass; and thereafter confining the resultant porous silicate glass characterized by such internal silicon-bonded toxic cation oxide groups.

6. The process of claim 5 wherein the confinement of said resultant porous silicate glass is effected by heating to collapse said pores containing such internal silicon-bonded toxic cation oxide groups.

7. The process of claim 5 which comprises impregnating the ion-exchanged porous silicate glass which contains bonded non-radioactive cations as defined in claim 1 or 2 with a liquid having a pH in the range of from about 2 to about 13 and containing radioactive cations, for a period of time to dispose said liquid within the pores of said glass and to displace at least a portion of said non-radioactive cations by said radioactive cations to provide a distribution of internal surface silicon-bonded radioactive cation oxy groups disposed within the pores of said glass; and thereafter confining the resultant porous silicate glass characterized by such internal silicon-bonded radioactive cation oxy groups.

8. The process of claim 7 wherein said ion-exchanged porous silicate glass contains non-radioactive alkali metal cations bonded to silicon through divalent oxygen linkages on the internal surfaces of said pores of the glass.

9. The process of claim 7 wherein from about 0.3 mol percent to about 10 mol percent non-radioactive sodium cation is bonded to said silicon.

10. Process of claim 9 wherein the resultant porous silicate glass contains at least one part per billion by weight of radioactive cation bonded to silicon through divalent oxygen linkages.

11. Process of claim 7 wherein said liquid is an aqueous medium comprising a mixture of radioactive cations selected from the group consisting of radioactive cations of rubidium, strontium, the lanthanides, cobalt, cadmium, zironium, molybdenum, technetium, niobium, ruthenium, palladium, tellurium, cesium, barium, francium, yttrium, radium, the actinides, and mixtures thereof; wherein the amount of said non-radioactive cations in said porous silicate glass is about 0.3 mol percent to about 10 mol percent; and wherein said pH is in the range of from about 6 to about 9.5.

12. A process for removing radioactive cations from a liquid stream of radioactive nuclear wastes containing the same and concentrating said radioactive cations comprising impregnating an ion-exchanged porous silicate glass which contains bonded non-radioactive cations defined in claim 1 or 2, with a liquid stream of radioactive nuclear wastes containing radioactive cations for a period of time sufficient to dispose said liquid within the pores of said glass and to displace said non-radioactive cations to provide a distribution of internal silicon-bonded radioactive cation oxide groups; and thereafter confining the resultant porous silicate glass characterized by such internal silicon-bonded radioactive cation oxide groups.

13. Process of claim 12 wherein said liquid containing radioactive cations has a radioactivity of about 0.01 microcurie to about 1 microcurie per milliliter.

14. A process which comprises impregnating a porous silicate glass or silica gel having interconnected pores and non-radioactive protons (H+) bonded to silicon through divalent oxygen linkages on the internal surfaces of said pores, with primary coolant water of a boiling water reactor system which contains radioactive cations to dispose said primary coolant water within the pores of said glass or silica gel after adding ammonium hydroxide to said primary collant water to both maintain the pH thereof in the range of about 6 to about 9.5 and to effect the ion-exchange of said non-radioactive protons with ammonium cations, said non-radioactive ammonium cations being capable of being displaced by said radioactive cations to provide a distribution of internal silicon-bonded radioactive cation oxy groups within the pores of said glass or silica gel; and thereafter confining the resultant porous silicate glass or silica gel characterized by such internal silicon-bonded radioactive cation oxy groups.

15. Process of claim 14 wherein said pH is maintained in the range of from above 7 to about 9.

16. The ion-exchanged porous silicate glass product of claim 1.

17. The ion-exchanged porous silicate glass product of claim 2.

18. The ion-exchanged porous silicate glass product of claim 1 or 2 wherein said alkali metal cation is potassium bonded to surface silicon through divalent oxy groups.

19. The ion-exchanged porous silicate glass product of claim 1 or 2 wherein said alkali metal is sodium bonded to surface silicon through divalent oxy groups.

20. An ion-exchange column comprising the ion-exchanged porous silicate glass product of claim 16 or 17 as ion-exchange medium therefor.

21. An ion-exchange column comprising the ion-exchanged porous silicate glass product of claim 19 as ion-exchanged medium therefor.

22. Porous silicate glass prepared as defined in claim 1 and containing at least one part per billion by weight of radioactive cation of the group consisting of radioactive cations of rubidium, strontium, the lanthanides, cobalt, cadmium, zirconium, molybdenum, technetium, niobium, ruthenium, palladium, tellurium, cesium, barium, francium, yttrium, radium, the actinides, and mixtures thereof; said radioactive cation bonded to surface silicon through divalent oxygen linkages.

23. Porous silicate glass of at least 75 mol percent $SiO_2$, an interconnected pore structure, a surface to weight ratio of from about 5 to about 1500 $m^2/g$, and containing non-radioactive ammonium cations disposed within the interconnecting pores and bonded to surface silicon thereof through divalent oxy linkages.

24. The porous silicate glass of claim 23 which, in addition to ammonium cations, contains non-radioactive cations of the group consisting of alkali-metal cations, Group I(b) cations and mixtures thereof, bonded to said surface silicon.

25. The porous silicate glass of claim 24 characterized by a surface to weight ratio at least upward of 100 $m^2/g$ and ammonium and sodium cations bonded to said surface silicon.

26. The porous silicate glass of claim 23 or 24 or 25 characterized by about 0.3 to about 10 mol percent cations.

27. The porous silicate glass of claims 24 or 25 characterized by about 1 to about 10 mol percent cations.

28. The porous silicate glass of claims 23 or 24 or 25 in particulate form.

29. An ion-exchange column comprising particulate porous silicate glass as defined in claims 23 or 24 or 25.

30. Porous silicate glass characterized by at least 75 mol percent $SiO_2$, an interconnecting pore structure, a surface to weight ratio of from about 5 to about 1500 $m^2/g$, and radioactive cations, disposed within the interconnecting pores and bonded to surface silicon through divalent oxy linkages, said radioactive cations of the group consisting of radioactive cations of rubidium, strontium, the lanthanides, cobalt, cadmium, zirconium, molybdenum, technetium, niobium, ruthenium, palladium, tellurium, cesium, barium, francium, yttrium, radium, the actinides, and mixtures thereof; said radioactive cation bonded to silicon through divalent oxygen linkages.

* * * * *